US010958572B2

(12) United States Patent
Gundavelli et al.

(10) Patent No.: US 10,958,572 B2
(45) Date of Patent: Mar. 23, 2021

(54) DIRECTING PACKETS TO SERVICE CHAIN ASSOCIATED WITH USER PLANE ANCHOR

(71) Applicant: Cisco Technology, Inc., San Jose, CA (US)

(72) Inventors: Srinath Gundavelli, San Jose, CA (US); Dhananjay Shrikrishna Patki, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 185 days.

(21) Appl. No.: 15/839,880

(22) Filed: Dec. 13, 2017

(65) Prior Publication Data

US 2019/0182153 A1 Jun. 13, 2019

(51) Int. Cl.
*H04L 12/08* (2006.01)
*H04L 12/715* (2013.01)
(Continued)

(52) U.S. Cl.
CPC .......... *H04L 45/64* (2013.01); *H04L 41/0893* (2013.01); *H04L 41/50* (2013.01);
(Continued)

(58) Field of Classification Search
CPC ......... H04L 45/64; H04L 45/00; H04L 45/38; H04L 67/327; H04L 67/32; H04L 67/00; H04L 41/0893; H04L 41/08; H04L 67/10; H04L 41/50; H04L 41/00; H04L 45/306; H04L 45/30; H04L 61/2007; H04L 61/20; H04L 49/70; H04L 49/00; H04L 45/745; H04L 45/74; H04W 8/08; H04W 8/02; H04W 28/02; H04W 28/00
(Continued)

(56) References Cited

U.S. PATENT DOCUMENTS 7,308,237 B2 12/2007 Kokkonen et al.
9,479,443 B2 * 10/2016 Bosch ..................... H04L 45/38
(Continued)

FOREIGN PATENT DOCUMENTS

WO  2014169878     10/2014
WO  2016/202363 A1 12/2016
WO  2017037208      3/2017

OTHER PUBLICATIONS

Gulbrandsen, A., et al; "A DNS RR for specifying the location of service (DNS SRV)"; Network Working Group; RFC2782, Feb. 2000.
(Continued)

*Primary Examiner* — Jeffrey M Rutkowski
*Assistant Examiner* — Luna Weissberger

(57) ABSTRACT

In one embodiment an apparatus comprising networking circuitry, and processing circuitry, the processing circuitry adapted to receive, via the networking circuitry, at least one indication of at least one service chain that is associated with a user plane anchor selected for anchoring a user equipment, out of a plurality of service chains in a network, the apparatus being the user equipment or being a host behind the user equipment, and the at least one service chain being fewer in number than the plurality of service chains, and use the at least one indication to direct at least one packet to at least one service function in the at least one service chain.

20 Claims, 14 Drawing Sheets

(51) Int. Cl.

| | | |
|---|---|---|
| *H04L 12/725* | (2013.01) | |
| *H04L 29/12* | (2006.01) | |
| *H04L 12/24* | (2006.01) | |
| *H04W 8/08* | (2009.01) | |
| *H04L 12/721* | (2013.01) | |
| *H04L 29/08* | (2006.01) | |
| *H04W 28/02* | (2009.01) | |
| *H04L 12/741* | (2013.01) | |
| *H04L 12/931* | (2013.01) | |

(52) U.S. Cl.
CPC ............ *H04L 45/306* (2013.01); *H04L 45/38* (2013.01); *H04L 61/2007* (2013.01); *H04L 67/10* (2013.01); *H04L 67/327* (2013.01); *H04W 8/08* (2013.01); *H04L 45/745* (2013.01); *H04L 49/70* (2013.01); *H04W 28/02* (2013.01)

(58) Field of Classification Search
USPC ........................................................ 370/235
See application file for complete search history.

(56) References Cited

U.S. PATENT DOCUMENTS

| | | | |
|---|---|---|---|
| 9,648,653 | B2 | 5/2017 | Kim et al. |
| 10,063,415 | B1* | 8/2018 | Kanakarajan ....... H04L 41/5054 |
| 2016/0085577 | A1* | 3/2016 | Gray ....... H04L 49/70 718/1 |
| 2017/0111187 | A1 | 4/2017 | Zanier et al. |
| 2017/0111274 | A1* | 4/2017 | Bays ....... H04L 49/70 |
| 2017/0150420 | A1* | 5/2017 | Olsson ....... H04W 8/06 |
| 2018/0077247 | A1* | 3/2018 | Wang ....... H04M 15/61 |
| 2018/0359337 | A1* | 12/2018 | Kodaypak ....... H04L 67/18 |
| 2019/0158408 | A1* | 5/2019 | Li ....... H04L 67/104 |

OTHER PUBLICATIONS

Haeffner, W. et al; "Service Function Chaining Use Cases in Mobile Networks; draft-ietf-sfc-usa-case-mobility-07"; Oct. 11, 2016.
Halpern, J., et al; "Service Function Chaining (SFC) Architecture"; IETF Oct. 2015; RFC7665.
Vixie, P. et al; "Dynamic Updates in the Domain Name System (DNS UPDATE)"; Network Working Group RFC 2136; Apr. 1, 1997.
Brown, Gabriel; Senior Analyst, Heavy Reading; "Designing 5G—Ready Mobile Core Networks"; Sep. 2016.
Cisco White Paper; "The Cisco 5G Strategy Series: Packet Core, Transport, and Identity Management"; 2016.
International Search Report and Written Opinion in counterpart International Application No. PCT/US2018/064197, dated Mar. 25, 2019, 15 pages.
Technical Specification, "3rd Generation Partnership Project; Technical Specification Group Services and System Aspects; System Architecture for the 5G System; Stage 2 (Release 15)", 3GPP TS 23.501, V1.6.0, Dec. 2017, 181 pages.
Brown, Gabriel, "Personalized Subscriber Services: Architectural Options for Mobile Operators", White Paper, Jan. 2016, 10 pages.
Metaswitch Networks, "What is the 5G User Plane Function (UPF)?", https://www.metaswitch.com/knowledge-center/-eference/what-is-the-5g-user-plane-function-upf, downloaded Apr. 15, 2020, 5 pages.
Gen_Ing, "AMF: Access and Mobility Function", https://forum.huawei.cornienterpriseien/amf-vs-smf/thread/564567-100305, Sep. 3, 2019, 3 pages.
Keller, Ralf et al., "5G migration strategy from EPS to 5G system", https://www.ericsson.cornienireports-and-papers aricsson-technology-review/articles/migration-from-eps-to-5gs, Feb. 24, 2020, 19 pages.
Holma, Harri, "Nokia 5G radio: simple to deploy on top of another vendor's 4G", https://www.nokia.com/blog/nokia-5g-radio-simple-deploy-top-another-vendors-4g/, Mar. 26, 2019, 10 pages.
GSM Association, "ZTE Full-Scene UPF, Simplified and On-Demand", https://www.mobileworldlive.comizte-updates-2019-20/zte-full-scene-upf-simplified-and-on-demand/, Oct. 16, 2019, 8 pages.
Sivaraj, Rajarajan, "5G NR: Optimizing RAN design architecture to support new standards", Dec. 3, 2018, 35 pages.

\* cited by examiner

DIRECTING PACKETS TO SERVICE CHAIN ASSOCIATED WITH USER PLANE ANCHOR

TECHNICAL FIELD

The present disclosure generally relates to mobile communications.

BACKGROUND

In the 4G network architecture the control plane (CP) and the user plane (UP—also referred to herein as the data plane) functions of the mobile anchor are not necessarily separated. However, one of the key aspects of the 5G network architecture is the separation of the CP and UP functions of the mobile anchor. User plane elements may reside, for instance, on generic networking hardware, and the control plane may reside, for instance, as a software element in the cloud. The usage of a centralized control plane and a distributed user plane allows elastic scaling of the control plane with flexibility in user plane resource allocation.

BRIEF DESCRIPTION OF THE DRAWINGS

So that the present disclosure may be understood by those of ordinary skill in the art, a more detailed description may be had by reference to aspects of some illustrative implementations, some of which are shown in the accompanying drawings. The appended drawings, however, illustrate only some example features of the present disclosure and are therefore not to be considered limiting, for the description may admit to other effective features.

Figure 1:
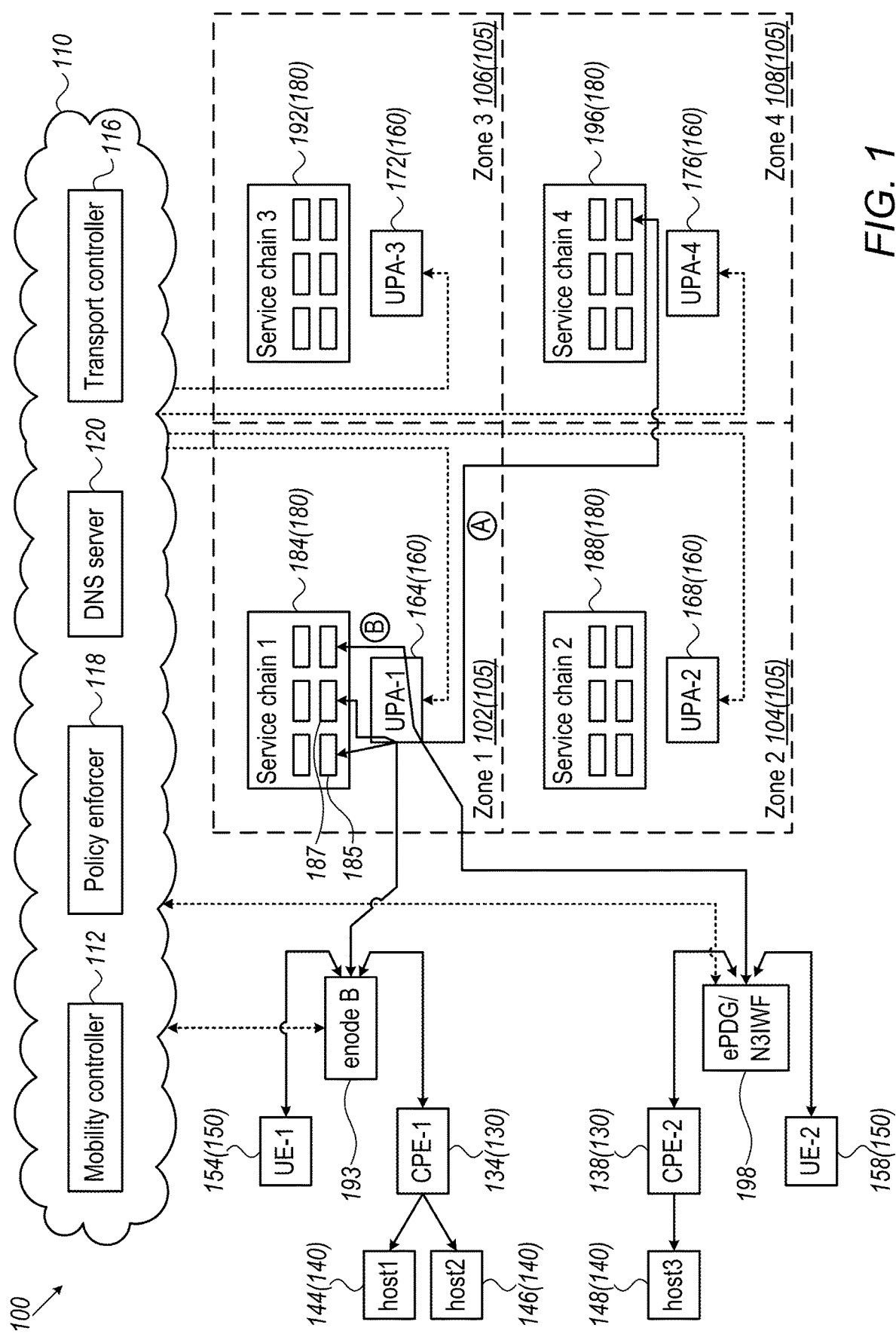
FIG. 1 is a block diagram of a network, in accordance with some embodiments of the presently disclosed subject matter.

In accordance with common practice the various features illustrated in the drawings may not be drawn to scale. Accordingly, the dimensions of the various features may be arbitrarily expanded or reduced for clarity. In addition, some of the drawings may not depict all of the elements, stages, modules, etc. of a given network, method, apparatus etc.

DESCRIPTION OF EXAMPLE EMBODIMENTS

Overview

There is provided, in accordance with some embodiments of the presently disclosed subject matter, an apparatus comprising networking circuitry, and processing circuitry, the processing circuitry adapted to receive, via the networking circuitry, at least one indication of at least one service chain that is associated with a user plane anchor selected for anchoring a user equipment, out of a plurality of service chains in a network, the apparatus being the user equipment or being a host behind the user equipment, and the at least one service chain being fewer in number than the plurality of service chains, and use the at least one indication to direct at least one packet to at least one service function in the at least one service chain.

There is further provided, in accordance with some embodiments of the presently disclosed subject matter, an apparatus comprising networking circuitry, and processing circuitry, wherein the processing circuitry is adapted to receive, via the networking circuitry, a request from a user equipment or from a host that is behind the user equipment, and send, via the networking circuitry, a response to the user equipment or to the host, the response including at least one indication of at least one service chain that is associated with a user plane anchor selected for anchoring the user equipment, out of a plurality of service chains in a network, the at least one service chain being fewer in number than the plurality of service chains, and the response enabling at least one of the user equipment, the host, or at least one other host behind the user equipment, to use the at least one indication to direct at least one packet to at least one service function in the at least one service chain.

DETAILED DESCRIPTION OF EXAMPLE EMBODIMENTS

FIG. 1 is a block diagram of a network 100, in accordance with some embodiments of the presently disclosed subject matter.

Network 100 is a mobile network, such as a 4G or 5G mobile network. Network 100 optionally includes a cloud 110. Network 100 includes a mobility controller 112, a transport controller 116, and a policy enforcer 118, optionally in cloud 110. Elements 112, 116 and 118 are functional elements which may be implemented using any appropriate hardware and/or software. Software, when referred to herein, may include firmware where appropriate. Transport controller 116 and policy enforcer 118 may be adapted to manage routing polices on the data plane. The functionality of mobility controller 112 will be elaborated upon in the description below.

Mobility controller 112 may be implemented, for example, by a Cisco® unified computing system (UCS) or by any other appropriate apparatus in the cloud. In some other embodiments, network 100 may not necessarily include cloud 110; and/or mobility controller 112 may not necessarily be in cloud 110. In such embodiments, mobility controller 112 may be implemented by any appropriate apparatus which is at least partly in the core network of network 100. An appropriate apparatus that is in the core network and/or in the cloud may include, for instance, processing circuitry, one or more memories (also referred to herein as one or more computer readable storage media), and networking circuitry. The memory/ies may include software (also referred to herein as computer readable code) which may be executed by processor(s) (if any) included in the processing circuitry. Mobility controller 112 optionally includes a session management function (SMF). If network 100 is a 4G network, a mobility management entity (MME) and optionally a public data network gateway (PGW) may correspond to mobility controller 112.

Network 100 optionally includes one or more domain name system (DNS) servers, e.g. in cloud 110, of which one DNS server 120 is shown in FIG. 1. DNS is described herein as an example of a query defined service (or equivalently as an example of a directory), but lightweight directory access protocol (LDAP), or any other appropriate directory, may be used in addition to or instead of DNS.

If network 100 is a typical Tier-1 network, there may be four to seven zones 105 distributed in the core network of network 100. FIG. 1 shows four such zones, namely: zone 1 102, zone 2 104, zone 3 106 and zone 4 108. Zones 105, for example, may be associated with a particular mobile network operator (also referred to herein as a wireless service provider).

Each zone 105 may include one or more service chains 180. Each service chain 180 may include one or more service functions. Examples of a service function include Internet Protocol Security (IPSec) gateway (e.g. IPsec protocol used by the security gateway (Sec-GW)), local mobility anchoring (LMA), gaming, application content delivery and/or any other appropriate function. The service function(s) of a particular service chain 180 are depicted in FIG. 1 as small rectangle(s) within a larger rectangle representative of the particular service chain 180. For example in FIG. 1, service functions LMA 185 and IPSec 187 are shown labeled in service chain 184. Reference is made interchangeably herein to a service function in a service chain 180, or to a service function instance. A data packet (also referred to as a user packet) served by a service chain may require one or more of the service functions of a service chain. FIG. 1 shows four service chains 180, namely: service chain 1 184 in zone 1 102, service chain 2 188 in zone 2 104, service chain 3 192 in zone 3 106 and service chain 4 196 in zone 4 108. Depending on the implementation, two different service chains 180 may or may not have identical service function(s).

Each zone 105 may include one or more user plane anchors (UPAs) 160. Four user plane anchors 160 (also referred to as an Internet Protocol anchors) are shown in FIG. 1. User plane anchor 1 (UPA-1) 164 is shown in zone 1 102. User plane anchor 2 (UPA-2) is shown in zone 2 104. User plane anchor 3 (UPA-3) 172 is shown in zone 3 106. User plane anchor 4 (UPA-4) 176 is shown in zone 4 108.

User plane anchors 160 are functional elements which may be implemented using any appropriate hardware and/or software. For example, user plane anchors 160 may be implemented by element(s) which are in the core network of network 100. Continuing with describing such an example, any particular user plane anchor 160 may be implemented by any appropriate router such as a Cisco ASR9000, Cisco ASR1000, Cisco ASR 5500, Cisco UCS, and/or by any other appropriate apparatus. If network 100 is a 4G network, a PGW may correspond to any user plane anchor 160. An appropriate apparatus in the core network may include, for instance, processing circuitry, one or more memories, and networking circuitry. The memory/ies may include software which may be executed by processor(s), if any, included in the processing circuitry. Although user plane anchors 160 are shown separate from mobility controller 112 in FIG. 1, in some embodiments mobility controller 112 and user plane anchor(s) 160 may be implemented by a shared apparatus, e.g. if mobility controller 112 and user plane anchor(s) 160 both correspond to PGW(s).

User equipments (UEs) are devices which may communicate wirelessly in network 100. User equipments (UEs) that are customer premises equipment (CPE) 130 may be anchored at respective user plane anchors 160. Two CPEs 130 are shown in FIG. 1, namely: CPE-1 134 and CPE-2 138. Both CPE-1 134 and CPE-2 138 are shown anchored at UPA-1 164. It is noted that CPE(s) 130 are UEs from the perspective of mobility controller 112 and UPAs 160. A particular CPE 130 may, for instance, be any router adapted to communicate wirelessly in network 100, such as a Cisco Integrated Services Router (ISR) series router. Additionally or alternatively, UEs 150 that are not CPEs may be anchored at respective user plane anchors 160. Two UEs 150 that are not CPEs are shown in FIG. 1, namely: UE-1 154 and UE-2 158 which are both shown anchored at UPA-1 164. Examples of such UEs 150 may include smartphones, laptops with cellular dongles, connected vehicle devices with cellular access, etc. When referring herein to user equipment(s) or UE(s), without a label, the reference should be understood as referring to UE(s) that are CPE(s) (such as CPE(s) 130), and/or as referring to UE(s) that are not CPE(s) (such as UE(s) 150).

One or more hosts 140 that are adapted to connect (via wired and/or wireless connections) with any particular CPE 130, are referred to herein as being behind the particular CPE 130. Three hosts 140 are shown in FIG. 1, namely: host 1 144, host 2 146, and host 3 148. Host 1 144 and host 2 146 are shown behind CPE-1 134. Host 3 148 is shown behind CPE-2 138. Examples of a particular host 140 may include any end user device such as a laptop, desktop, phone with Wi-Fi, VoIP phone, Internet of Thing (IOT) sensor, etc. that is behind any particular CPE 130, connecting to the particular CPE 130 via wired and/or wireless connection(s). Such wired and/or wireless connection(s) are also referred to herein as an access network. A given CPE 130, UE 150, or host 140 may include for instance, processing circuitry, one or more memories, and networking circuitry. The memory/ies may include software which may be executed by processor(s), if any, included in the processing circuitry.

Individual UPAs 160 may be selected for the anchoring of individual CPEs 130 and UEs 150 in network 100 arbitrarily, or for any appropriate reason(s). As an example of a possible reason, an individual UPA 160 that is closest to a given CPE 130 or UE 150 may be selected for the anchoring of the given CPE 130 or UE 150. Additionally or alternatively, individual UPAs may be selected based on load balancing, make before break, etc. Depending on the implementation, an individual CPE 130 or UE 150 may be anchored to a single UPA 160 at a time, or may be anchored to two or more UPAs 160 simultaneously.

Network 100 further includes one or more mobile base stations 193 (e.g. enodeB, nodeB, gNB, femtocell, microcell, etc.). One mobile base station 193 is shown in FIG. 1; and UE-1 154 and CPE-1 134 are shown connected thereto. Network 100 optionally includes one or more evolved packet data gateway (ePDG) or Non-3GPP Core Network interworking functions (N3IWF) 198 with functionality that is described in more detail below with reference to FIG. 7. One ePDG/N3IWF 198 is shown in FIG. 1; and CPE-2 138 and UE-2 158 are shown connected thereto. CPE-2 138 and UE-2 158 may connect to ePDG/N3IWF 198 via a non-3GPP network such as Wi-Fi. The non-3GPP network, for instance, may be untrusted. Any appropriate apparatus may implement mobile base station 193 and/or ePDG/N3IWF 198. An appropriate apparatus may include, for instance, processing circuitry, one or more memories, and networking circuitry. The memory/ies may include software which may be executed by processor(s), if any, included in the processing circuitry.

Conventionally, CPEs 130, hosts 140 behind CPEs 130, and/or UEs 150 are not aware of the locations of the user plane anchors 160 to which the CPEs 130 and/or UEs 150 are respectively anchored. In the absence of such an awareness, applications such as Mobile Access Gateway (MAG)/IPsec client on a particular CPE 130, host 140 or UE 150 lack the capability of directing user packets ("packets") to a service function instance that is associated with a specific user plane anchor 160 to which the particular CPE 130 or UE 150 is anchored. For the sake of discussion in this paragraph it is assumed that in accordance with some embodiments of the current subject matter, a particular service chain 180 (and therefore the service function(s) in the particular service chain 180) is associated with a particular UPA 160 that is in the same zone 105 as the particular service chain 180. In FIG. 1, CPE-1 134 and UE-1 154 are shown anchored to UPA-1 164 in zone 1 102, and packet(s) from any of CPE-1 134 or UE-1 154 (or host(s) behind CPE-134) are shown directed to service function(s) 185 and 187 in service chain 1 184 in zone 1 102. CPE-2 138 and UE-2 158 are also shown anchored to UPA-1 164 in zone 1 102. However under path A which follows the conventional approach, packet(s) from any of CPE-2 138 or UE-2 158 (or host(s) behind CPE-2 138) are shown directed to a service function in service chain 4 196 which is in zone 4 108; despite CPE-2 138 or UE-2 158 being anchored to UPA-1 164 in zone 1 102, which is associated with service chain 1 184. Under path B which is in accordance with some embodiments of the current subject matter, packet(s) from any of CPE-2 138 or UE-2 158 (or host(s) behind CPE-2 138) are shown directed to a service function in service chain 1 184 in zone 1 102, which is associated with UPA-1 164. It is noted that whether a particular CPE 130 or UE 150 connects via a particular enodeB 193 or ePDG/NW3IF 198 does not necessarily affect how packets are conventionally directed to a service function instance, and packet(s) from any of UE-1 154 or CPE-134 (or host(s) behind CPE 134) could have conventionally been directed to service function(s) in service chain 4 196 in addition to or instead of packet(s) from any of UE-2 158 or CPE-2 138 (or host(s) behind CPE 138) being directed to service function(s) in service chain 4 196.

One or more service chains 180 (and therefore the service function(s) in the one or more service chains) may be associated with a particular user plane anchor 160 selected for anchoring a particular CPE 130 or UE 150. The quantity of service chain(s) 180 associated with the particular user plane anchor 160 may be fewer than the quantity of service chains 180 in network 100. For example, a plurality of service chains 180 having different service functions may be associated with a particular user plane anchor 160 so that packets from the particular CPE 130 or UE 150 are not limited to the service function(s) of a single associated service chain 180. The association of any service chain 180 (and consequently service functions in the service chain 180) with any user plane anchor 160 may be in accordance with any appropriate one or more criteria. For example, if the criterion or criteria includes proximity, one or more service chains 180, closest to a particular user plane anchor 160, out of the plurality of service chains 160 in network 100, may be associated with the particular user plane anchor 160. In another example, the criteria may include arbitrariness, balancing so that various service chains 180 are associated with various user plane anchors 160, etc.

Embodiments will now be described with reference to FIGS. 2 to 13 which enable any particular CPE 130, UE 150 or host 140 to direct packets to at least one service function instance. Such service function(s) are associated with the particular user plane anchor 160 to which the particular CPE 130 or UE 150 is anchored, or to which the CPE 130, behind which is the particular host 140, is anchored.

Figure 2:
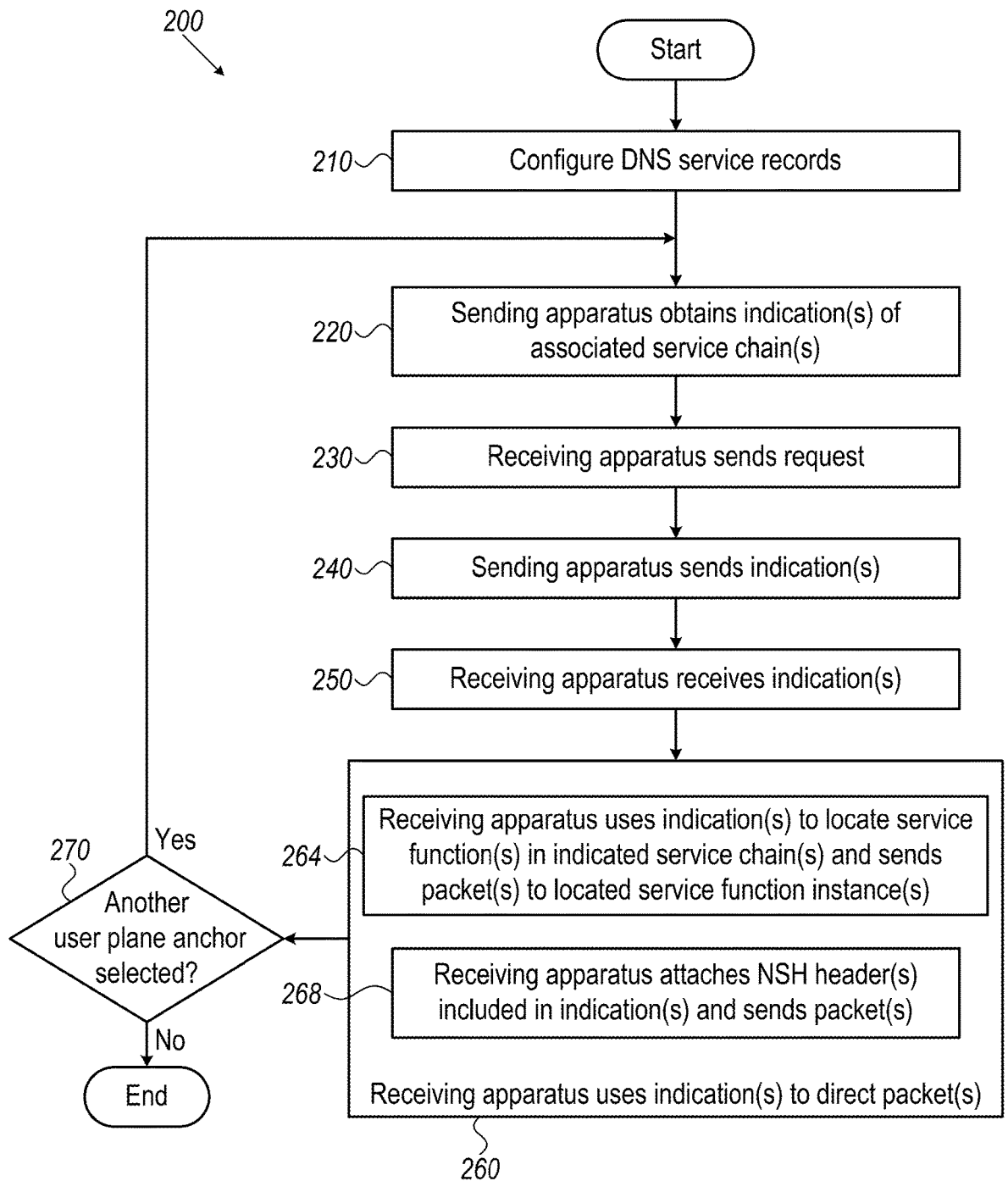
FIG. 2 is a flowchart of a method, in accordance with some embodiments of the presently disclosed subject matter.

FIG. 2 is a flowchart of a method 200, in accordance with some embodiments of the presently disclosed subject matter.

In optional stage 210, directory records of service function instances are configured. Such configuring enables the directory to locate the service function instances in response to queries that include indications of locations of respective service chains. For example, DNS service records of service function instances may be configured (e.g. initially and/or when updating the records) on DNS server 120 statically and manually; and/or DNS service records of service function instances may be configured (e.g. when updating the records) on DNS server 120 using dynamic DNS (DDNS), e.g. as defined by RFC 2136. DNS service records may be defined, for instance, as per RFC 2782. In accordance with some embodiments of the subject matter, a directory record for a service function instance (whether for DNS or any other appropriate directory such as LDAP) may include an indication of the location of the particular service chain 180 which includes the service function instance, and the corresponding Internet Protocol (IP) address (e.g. IPv4 address, IPv6 address, etc.) of the service function instance. For example, the directory record may include a fully qualified domain name FQDN for the service function instance (referred to as service FQDN), the FQDN including an indication of the location of the particular service chain 180 that includes the service function instance. Stage 210 may be repeated as necessary. For example, a directory record may be initially configured for any new service function instance, and/or any existing directory record for any existing service function instance may be configured in order to update the directory record when required. Stage 210 may be omitted in some embodiments if the directing of packet(s) to a service function instance does not require a directory such as DNS. See for example, the description below of stage 268.

In stage 220, at least one indication is obtained, of at least one particular service chain 180 that is associated with a particular user plane anchor 160 selected for anchoring a particular CPE 130 or UE 150. The quantity of associated service chain(s) 180 for which indication(s) is obtained may be one or more, but it is assumed that the quantity is fewer than the quantity of service chains 180 in network 100. For simplicity's sake, method 200 is described with reference to one of the indication(s), the one indication being an indication of a particular associated service chain 180. For example, the particular associated service chain 180 may be the closest or one of the closest service chains 180 to the particular user plane anchor 160, out of the plurality of service chains 180 in network 100.

The indication of the particular associated service chain 180 may be obtained in stage 220 by an apparatus that will be sending the indication ("sending apparatus") in method 200 to another apparatus ("receiving apparatus"). The receiving apparatus is an apparatus that will be receiving the indication and that is adapted to use the indication to direct packet(s). If the sending apparatus implements an element, such as mobility controller 112, that is adapted to identify the particular associated service chain 180, then the obtaining may include identifying the particular associated service chain 180, e.g. in accordance with any appropriate one or more criteria. For example, assuming the criterion or criteria includes proximity, mobility controller 112 may detect or have access to a topology of network 100, and therefore may be adapted to identify the particular associated service chain 180 based on the topology, e.g. the particular associated service chain 180 being the closest service chain or one of the closest service chains to the particular user plane anchor 160. As another example, the obtaining may include the sending apparatus receiving the indication. In such an example, and depending on the sending apparatus, the sending apparatus may or may not be adapted to also use the indication to direct packet(s).

In some embodiments, the indication of the particular associated service chain 180 may be indicative of the location of the particular associated service chain 180. For example, the indication may be presented as a composite object with multiple fields that represent the location of the service chain (e.g. global positioning system (GPS) parameters providing Geo-location with latitude, longitude and altitude as per World Geodetic System 1984). Additionally or alternatively, the indication may include a service-location label such as zone-1, Milpitas (or any other city), etc. It is noted that if a service-location label is used, such as zone-1, the label may or may not be valid for both the location of the particular user plane anchor 160 and the location of the particular associated service chain 180, depending on the location of the particular user plane anchor 160 vis-à-vis the particular associated service chain 180. In some other embodiments, in addition to, or instead of the indication of the particular associated service chain 180 being indicative of the location of the particular associated service chain 180, the indication of the particular associated service chain 180 may include one or more network service (NSH) headers for one or more traffic classes. In such embodiments, each NSH header may be indicative of one or more service functions in the particular associated service chain 180.

In stage 230, the receiving apparatus sends a request to the sending apparatus. Optionally, the request that is sent requests an indication of the particular associated service chain. Such a request that requests an indication may not necessarily explicitly mention the particular associated service chain 160, but may instead requests the receipt of an indication which is interpreted by the sending apparatus as requesting the indication of the particular associated service chain 160. The receiving apparatus may be, for instance, the particular CPE 130 or UE 150 that is anchored or is to be anchored to the selected user plane anchor 160, or may be a particular host 140 behind the particular CPE 130. The sending apparatus may, for instance, be the particular CPE 130, if the receiving apparatus is any host 140 behind the particular CPE 130. Alternatively, the sending apparatus may, for instance, implement mobility controller 112, particular user plane anchor 160 selected for anchoring, ePDG/N3IWF 198, etc., if the receiving apparatus is the particular CPE 130 or UE 150. Stages 220 and 230 may be performed in any order or in parallel.

In stage 240, the sending apparatus sends the indication of the particular associated service chain 180 to the receiving apparatus. The indication may be included, for instance, in a response to the request of stage 230 sent by the receiving apparatus. It is noted that any sending and/or receiving described in method 200 may be direct and/or may be or indirect, as appropriate. For example, the indication may be sent in stage 240 directly to the receiving apparatus, or may be sent indirectly (e.g. via any mobile base station 193, via a non-3GPP network, etc.) to the receiving apparatus.

In stage 250, the receiving apparatus receives the indication of the particular associated service chain 180 that was sent in stage 240. For example, the indication may be sent and received as metadata associated with an IP address option (e.g. as metadata associated with prefix(es) and/or as metadata associated with address(es)/subnet(s)) by way of an IP address configuration mechanism; and/or may be sent and received during session establishment (e.g. via non-access stratum (NAS) signaling).

It is noted that although the receiving apparatus is adapted to use the indication to direct packet(s), in some cases of method 200 the receiving apparatus may not use the indication to direct packet(s). For example, if the receiving apparatus is a particular CPE 130, then the particular CPE 130 may not necessarily use the indication to direct packet(s). In some cases of such an example, in addition to or instead of proceeding to stage 260, stages 220 to 250 may be repeated one or more times, with the particular CPE 130 as the sending apparatus and any of hosts 140 behind the particular CPE 130 as the receiving apparatus during the repetition. For simplicity's sake, it is assumed in the following description that receiving apparatus will use the indication to direct packet(s) and therefore method 200 continues to stage 260.

In stage 260, the receiving apparatus uses the indication to direct at least one packet to at least one service function in the particular associated service chain 180. The indication may be used in any appropriate way to direct the at least one packet. For example, stage 260 may include stage 264 and/or stage 268.

In optional stage 264, the receiving apparatus (e.g. more specifically, an application on the receiving apparatus) may use the indication to locate one or more service functions in the particular closest service chain 180, and may send one or more packets to the located service function instance(s). The at least one directed packet referred to in stage 260 may include the one or more packets referred to in stage 264. Stage 264 may be performed, for instance, if the indication is indicative of the location of the particular associated service chain 180.

More specifically for example, the receiving apparatus may in stage 264 use the indication to construct one or more queries for one or more IP addresses of the service function(s) in the particular associated service chain 180. The query/ies may include, for instance, service FQDN(s) which are described in more detail elsewhere herein. For any of the query/ies, a directory (e.g. DNS server 120) may use a query (e.g. more specifically a service FQDN in the query) to search directory records of service function instances and may respond to the query with the IP address (e.g. IPv4 address, IPv6 address, etc.) of the service function instance. The receiving apparatus may thereby receive IP address(es) of the service function instance(s), in response to the query/ies. For any of the service function instance(s), the receiving apparatus may send one or more packets relating to a service function instance, of the packet(s) being directed, to the IP address of the service function instance.

In optional stage 268, one or more NSH headers for one or more traffic classes may be attached to one or more packets associated with the one or more traffic classes by the receiving apparatus (e.g. more specifically by an application, feature of protocol stack, etc. in the receiving apparatus); and the one or more packets may be sent by the receiving apparatus. The at least one directed packet referred to in stage 260 may include the one or more packets referred to in stage 268. For example, stage 268 may be performed if the indication includes the one or more NSH headers. A given NSH header for a given traffic class may be indicative of at least one service function in the particular associated service chain 180, and may be attached to packet(s) associated with the traffic class, so that such packet(s) will be served by the at least one service function in the particular associated service chain 180.

In optional stage 270, it may be determined whether another user plane anchor 160 has been selected for anchoring the particular CPE 130 or UE 150, instead of the particular user plane anchor 160. For example mobility controller 112 may select to re-anchor the particular CPE 130 or UE 150, arbitrarily or for any appropriate reason(s). One possible reason to re-anchor to the other user plane anchor 160 may be that the particular CPE 130 or UE 150 has moved closer to the other user plane anchor 160. In some embodiments, stage 270 may be omitted. For example, stage 270 may be omitted, if the particular the particular CPE 130 or UE 150 does not re-anchor; or if any re-anchoring is ignored by network 100. The terms re-anchoring, anchoring to another user plane anchor 160, and assigning to another user plane anchor 160 are used interchangeably herein.

If in stage 270 it is determined that no other user plane anchor 160 has been selected for anchoring, e.g. no other user plane anchor 160 selected during a current session where the particular CPE 130 or UE 150 is connected to network 100, then method 200 ends. For example, if the particular CPE 130 or UE 150 moves and is not re-anchored then the current session may end and method 200 may end.

If in stage 270 it is instead determined that a re-anchoring to another user plane anchor 160 has taken place, then any of stages 220 to 270 may be repeated in a current iteration for the other user plane anchor 160. For instance, at least one indication may be sent and received, regarding the service chain(s) 180 associated with the other user plane anchor 270 selected for anchoring, regardless of whether or not the service chain(s) 180 associated with the other user plane anchor 270 have changed from the service chain(s) 180 associated with the particular user plane anchor 160 in the previous iteration. Alternatively, for instance, if it is determined that a re-anchoring has taken place, then any of stages 220 to 270 may be repeated in a current iteration only if in the current iteration at least one of the indication(s) would be for a different service chain 180 than was indicated in the previous iteration of any of stages 220 to 260.

The indication(s) in the current iteration of any of stages 220 to 260 is/are also referred to herein as the updated indication(s). Depending on the embodiment, the sending and receiving apparatuses may or may not be the same in the current iteration as in the previous iteration of any of stages 220 to 260. For example, if in the previous iteration of any of stages 220 to 260 the sending apparatus was the previously selected user plane anchor 160, then in the current iteration of any of stages 220 to 260, the sending apparatus may be another user plane anchor 160 whose selection was determined in the previous iteration of stage 270.

For simplicity's sake, the discussion of a current iteration of any of stages 220 to 260 will focus on one indication of one service chain 180 associated with the other user plane anchor 160 whose selection was determined in the previous iteration of stage 270, even though the current iteration may include one or more indications of service chain(s) 180 associated with the other user plane anchor 160. Typically although not necessarily, if the indication in the current iteration of any of stages 220 to 260 is sent and received as metadata associated with an IP address option, then the indication in the current iteration of any of stages 220 to 260 may be sent and received as the same type of metadata associated with an IP address option, e.g. as metadata associated with prefix(es) and/or address(es)/subnet(s); as was the case in the previous iteration of any of stages 220 to 260. However, in some embodiments, the indication may be sent and received differently (e.g. by a different procedure) in the current iteration than in the previous iteration. Depending on the embodiment, prefix(es) and/or address(es)/subnet(s), if used in the current iteration of any of stages 220 to 260 for the other user plane anchor 160, may or may not remain the same as in the previous iteration of any of stages 220 to 260 for the particular user plane anchor 160.

If the particular CPE 130 or UE 150 may be anchored to two or more user plane anchors 160 simultaneously, then any of stages 220 to 270 of method 200 may be performed independently and/or in any appropriate coordinated manner for the various user plane anchors 160 to which the particular CPE 130 or UE 150 is anchored. Additionally or alternatively, any of stages 220 to 270 of method 200 may be performed for the various CPEs 130, hosts 140 and UEs 150 in network 100. For example, any of stages 220 to 270 may be performed for any given CPE 130, host 140 or UE 140 when connecting or reconnecting to network 100 and optionally may be repeated for the given CPE 130, host 140 or UE 140 while connected to network 100 if another user plane anchor is selected for re-anchoring. For any two of CPEs 130, hosts 140 and UEs 150 in network 100, any of stages 220 to 270 may be performed independently for each of the two, and/or may be performed in any appropriate coordinated manner.

In some embodiments, method 200 may include fewer, more and/or different stages than described herein with reference to FIG. 2. Additionally or alternatively, stages may be performed in a different order than illustrated in FIG. 2; two or more stages that are illustrated as being performed sequentially may be performed in parallel; and/or two or more stages that are described as being performed in parallel may be performed sequentially. For example, stages 220 and 230 may be performed in a different order, or in parallel.

Call flow diagrams 300 to 1300 that are discussed below illustrate some examples of some of the stages of method 200. For simplicity's sake, it is assumed in the discussion of call flow diagrams 300 to 1300 that a single service chain 180 (e.g. service chain 1 184) is associated with a single user plane anchor 160 (e.g. UPA-1 164), and that a single zone 105 (e.g. zone 1 102) includes a single service chain 180 (e.g. service chain 1 184). As mentioned above, such conditions may not necessarily be valid in other examples.

Figure 3:
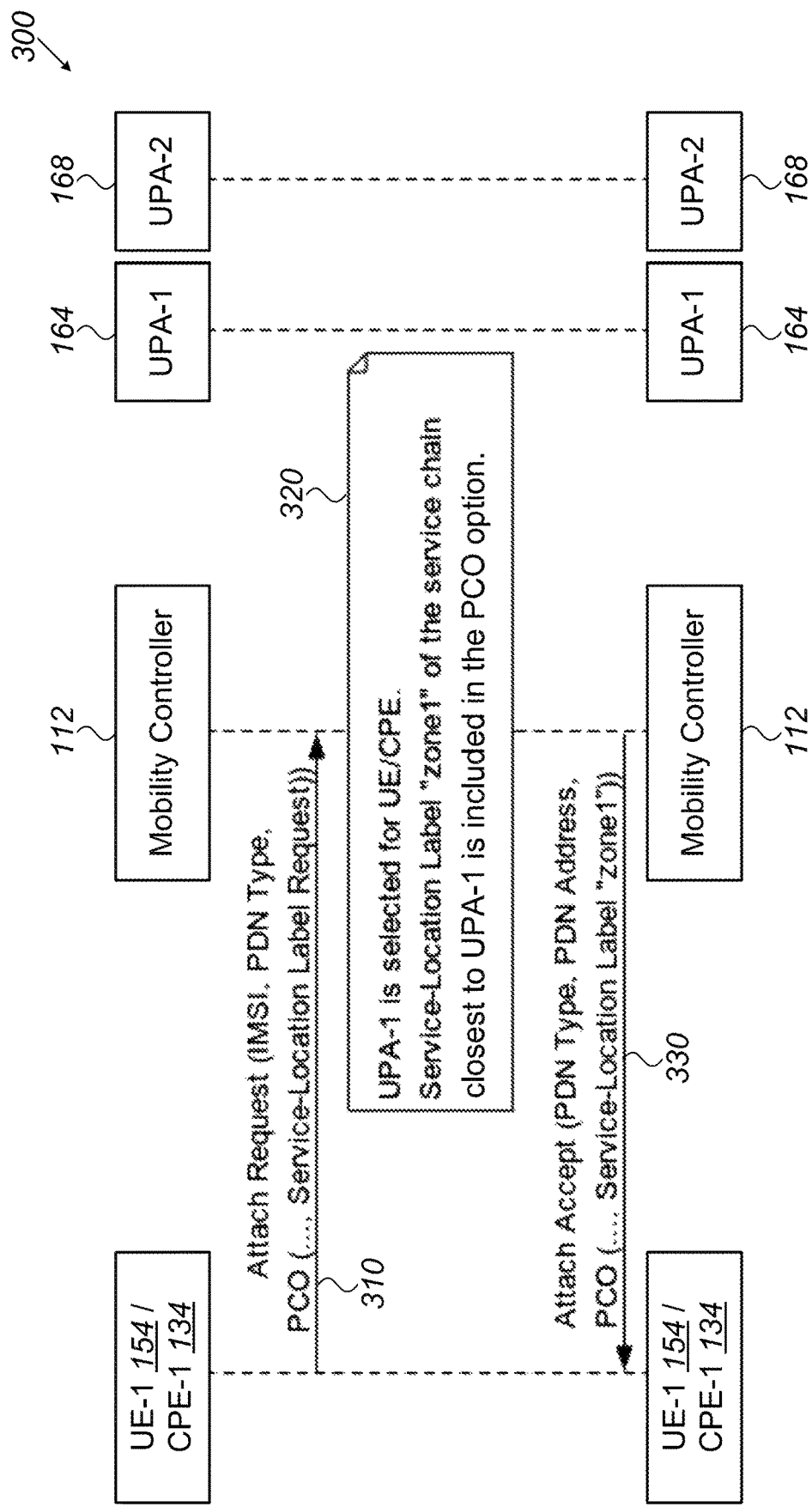
FIG. 3 is a call flow diagram illustrating a non-access stratum procedure, in accordance with some embodiments of the presently disclosed subject matter.

FIG. 3 is a call flow diagram 300, in accordance with some embodiments of the presently disclosed subject matter.

Call flow diagram 300 is used to illustrate an example of stages 220 to 250 of method 200. Call flow diagram 300 is described with reference to CPE-1 134 or UE-1 154 as an example of the receiving apparatus discussed in method 200, and with reference to UPA-1 164 and UPA-2 168. However, it should be evident that call flow diagram 300 may be applied, mutatis mutandis, to any CPE 130, UE 150 or UPA 160. Call flow diagram 300 allows CPE-1 134 or UE-1 154 to receive an indication indicative of the location of the associated service chain 180 via NAS signaling during session establishment. NAS signaling may be used for long term evolution (LTE), for LTE advanced, for 5G, etc. With regard to call flow diagram 300, an apparatus that implements mobility controller 112 is an example of the sending apparatus discussed with reference to method 200.

As part of NAS signaling, CPE-1 134 or UE-1 154 sends (310) an Attach Request to mobility controller 112. The Attach Request, for example, may include an international mobile subscriber identity (IMSI), a public data network (PDN) type, and a protocol configuration option (PCO) for requesting an indication of the service chain 180 associated with the user plane anchor 160 to which CPE-1 134 or UE-1 154 will be anchored, etc. It is noted that conventionally PCOs may be used for other options but not for requesting and receiving an indication of the associated service chain 180 (e.g. more specifically not for requesting and receiving an indication indicative of the location of the associated service chain 180). The Attach Request may therefore act in call flow diagram 300 as a request for an indication of the service chain 180 that is associated with the user plane anchor 160 to which CPE-1 134 or UE-1 154 will be anchored. In the example illustrated in FIG. 3, the indication will be indicative of location and more specifically the indication will include a service-location label, and therefore the Attach Request may act as a service-location label request. The Attach Request may be an example of stage 230 discussed above.

Mobility controller 112 selects (320) the user plane anchor 160 for the anchoring of CPE-1 134 or UE-1 154. In FIG. 3, the selected user plane anchor 160 is assumed to be UPA-1 164. Mobility controller 112 obtains an indication of the service chain 180 associated with UPA-1 164. The obtaining may include mobility controller 112 identifying the associated service chain 180. For example, if the associated service chain 180 is the closest service chain 180 to UPA-1 164, mobility controller 112 may identify the associated service chain 180 based on the topology of network 100. In FIG. 3 it is assumed that service chain 1 184 in zone 1 102 (FIG. 1) is the service chain 180 associated with (e.g. closest to) UPA-1 164; and that the indication includes service-location label "zone1". It is noted that in the above example UPA-1 164 is also in zone 1 102. However in other examples, an indication that is indicative of location of the associated service chain 180 may not necessarily be indicative to the same extent of the location of the selected user plane anchor 160. For example, if the selected user plane anchor 160 were instead UPA-3 172 in zone 3 106 and service chain 1 184 in zone 1 102 were associated with UPA-3 172, an indication (e.g. including service-location label "zone1") that is indicative of the location of an associated service chain 180 (e.g. service chain 1 184 in zone 1 102) would not be indicative to the same extent of the location of the UPA-3 172. As another example, if the indication includes the GPS parameters of service chain 1 184 associated with UPA-1 164, the indication may not be indicative to the same extent of the location of UPA-1 164 if UPA-1 164 has even slightly different GPS parameters.

The obtaining of the indication by mobility controller 112 may be an example of stage 220 discussed above.

Mobility controller 112 sends (330), in response to the Attach Request, an Attach Accept to CPE-1 134 or UE-1 154 which sent the Attach Request. For example, the Attach Accept may include the PDN type, the PDN address, and the indication (e.g. including service-location label "zone1") as a PCO. The sending of the Attach Accept may be an example of stage 240 of method 200. CPE-1 134 or UE-1 154 receives the Attach Accept and thereby receives the indication of the location. The receipt of the Attach Accept may be an example of stage 250 discussed above.

Figure 4:
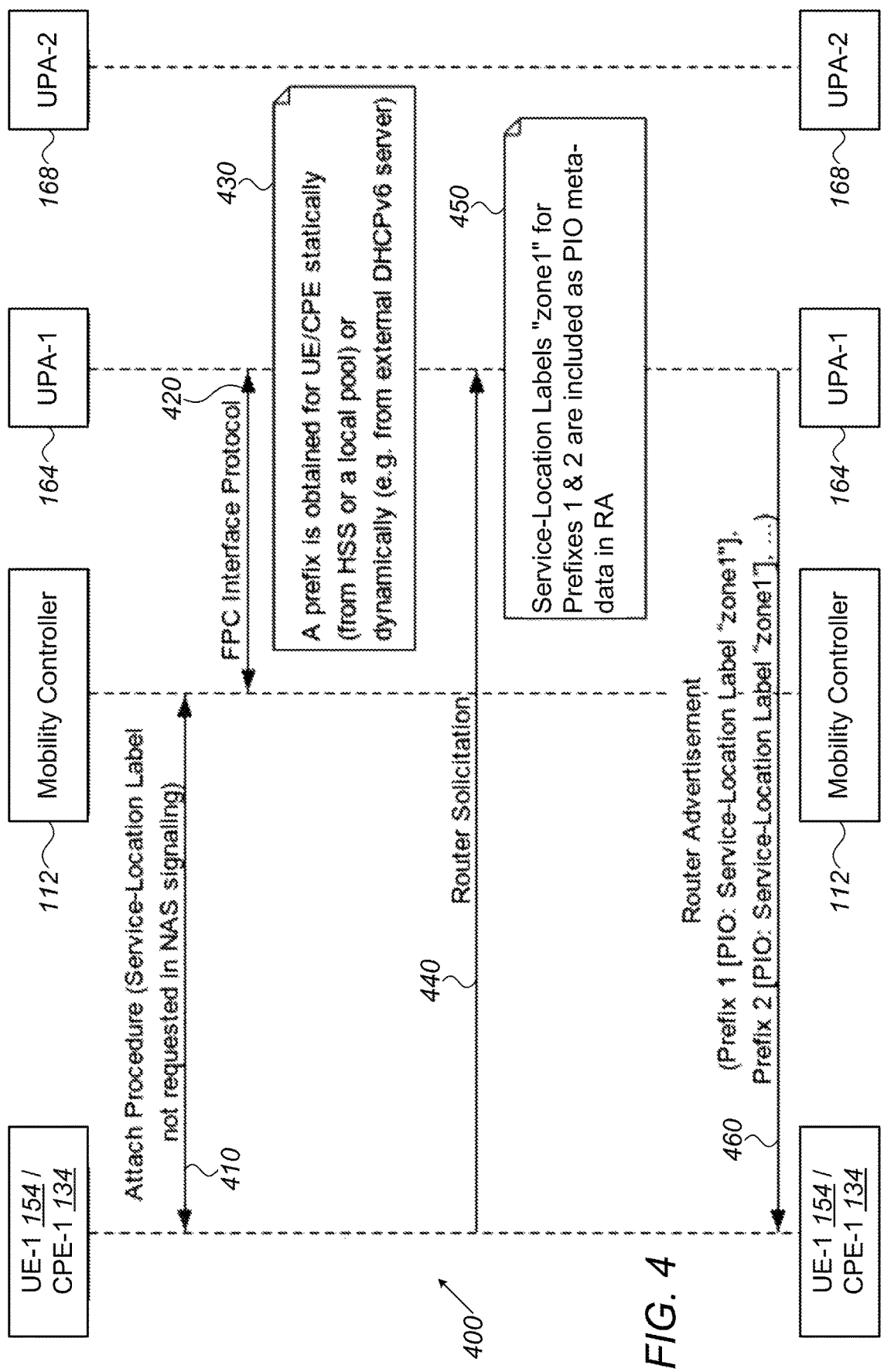
FIG. 4 is a call flow diagram illustrating a stateless address autoconfiguration procedure, in accordance with some embodiments of the presently disclosed subject matter.

FIG. 4 is a call flow diagram 400, in accordance with some embodiments of the presently disclosed subject matter. Call flow diagram 400 is used to illustrate another example of stages 220 to 250 of method 200. Call flow diagram 400 is described with reference to CPE-1 134 or UE-1 154 as an example of the receiving apparatus discussed in method 200, and with reference to UPA-1 164 and UPA-2 168. In FIG. 4, an apparatus that implements UPA-1 164 is an example of the sending apparatus discussed with reference to method 200. However, it should be evident that call flow diagram 400 may be applied, mutatis mutandis, to any CPE 130, UE 150 or UPA 160. Call flow diagram 400 allows CPE-1 134 or UE-1 154 to receive an indication of the associated service chain 180 via stateless address autoconfiguration (SLAAC). SLAAC is an example of a mechanism for delivering IP configuration parameters.

An attach procedure is performed (410) by CPE-1 134 or UE-1 154 and by mobility controller 112, using NAS signaling. The attach procedure includes CPE-1 134 or UE-1 154 sending an Attach Request to mobility controller 112. However, the Attach Request does not request any indication of the service chain 180 associated with the user plane anchor 160 to which CPE-1 134 or UE-1 154 will be anchored (e.g. does not include a service-location label request). The attach procedure further includes mobility controller 112 selecting the user plane anchor 160 for anchoring of CPE-1 134 or UE-1 154. In FIG. 4, the selected user plane anchor 160 is assumed to be UPA-1 164. Mobility controller 112 obtains an indication of the service chain 180 associated with UPA-1 164. The obtaining may include identifying the associated service chain 180 as discussed above with reference to FIG. 3. In FIG. 4, it is assumed that the associated (e.g. closest) service chain 180 is service chain 1 184 in zone 1 102, and that the indication is indicative of location of service chain 1 184 by including service-location label "zone1". The attach procedure further includes mobility controller 112 sending an Attach Accept to CPE-1 134 or UE-1 154 which sent the Attach Request, in response to the Attach Request. The Attach Accept does not include the indication of the associated service chain 1 184.

Assuming that mobility controller 112 and UPA-1 164 are separately implemented, mobility controller 112 and UPA-1 164 then communicate (420) via a forwarding policy configuration (FPC) interface protocol or any other appropriate interface protocol. Mobility controller 112 passes the indication to UPA-1 164 via the FPC interface protocol or via any other appropriate interface protocol. In such a manner, UPA-1 164 obtains the indication of associated service chain 1 184 by receiving the indication. The obtaining of the indication by UPA-1 164 may be an example of stage 220 of method 200.

UPA-1 164 obtains (430) one or more prefixes for CPE-1 134 or UE-1 154 statically or dynamically. For example, the prefix(es) may be obtained statically from a home subscriber server (HSS) or a local pool. As another example, the prefix(es) may be obtained dynamically from an external Dynamic Host Configuration Protocol version 6 (DHCPv6) server. Two prefixes relating to service chain 1 184 are shown in FIG. 4, namely: prefixes 1 and 2.

CPE-1 134 or UE-1 154 sends (440) a Router Solicitation to UPA-1 164. The Router Solicitation does not request any indication of the service chain 180 associated with UPA-1 164. The sending of the Router Solicitation may be an example of stage 230 of method 200.

UPA-1 164 includes (450) the indication (e.g. including service-location label "zone1") of the associated service chain 1 184 as prefix information option (PIO) metadata in a Router Advertisement (RA).

UPA-1 164 sends (460) the RA to CPE-1 134 or UE-1 154. The RA includes the indication of the associated service chain 1 184 as PIO metadata. The indication is thereby piggybacked to the prefix(es), or in other words sent and received as metadata associated with the prefix(es). It is noted that conventionally, such an indication of the associated service chain 1 184 (e.g. more specifically an indication indicative of the location of the associated service chain 180) would not be included as PIO metadata, although other data such as an on-link flag and/or an autonomous flag may be included as PIO metadata.

CPE-1 134 or UE-1 154 receives the RA and thereby receives the indication of associated service chain 1 184. The sending and receiving of the RA may be examples of stages 240 and 250 respectively of method 200.

Figure 5:
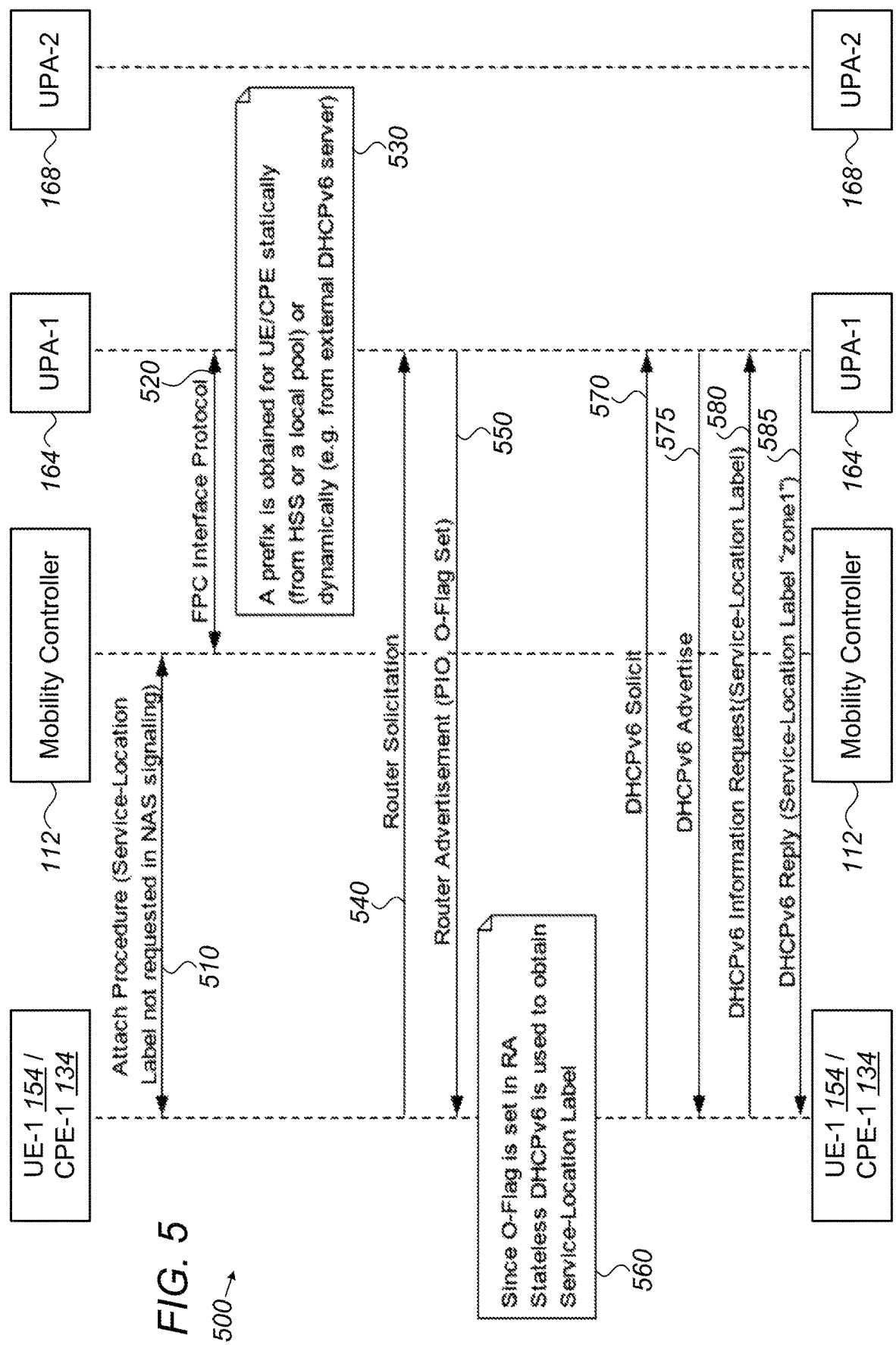
FIG. 5 is a call flow diagram illustrating a stateless dynamic host configuration protocol version 6 procedure, in accordance with some embodiments of the presently disclosed subject matter.

FIG. 5 is a call flow diagram 500, in accordance with some embodiments of the presently disclosed subject matter. Call flow diagram 500 is used to illustrate another example of stages 220 to 250 of method 200. Call flow diagram 500 is described with reference to CPE-1 134 or UE-1 154 as an example of the receiving apparatus discussed in method 200, and with reference to UPA-1 164 and UPA-2 168. In FIG. 5, an apparatus that implements UPA-1 164 is an example of the sending apparatus discussed with reference to method 200. However, it should be evident that call flow diagram 500 may be applied, mutatis mutandis, to any CPE 130, UE 150 or UPA 160. Call flow diagram 500 allows CPE-1 134 or UE-1 154 to receive an indication of an associated service chain 180 via stateless DHCPv6. DHCPv6 is an example of a mechanism for delivering IP configuration parameters.

An attach procedure is performed (510) by CPE-1 134 or UE-1 154 and mobility controller 112. The attach procedure includes CPE-1 134 or UE-1 154 sending an Attach Request to mobility controller 112. However, the Attach Request does not does not request any indication of the service chain 180 associated with the user plane anchor 160 to which CPE-1 134 or UE-1 154 will be anchored (e.g. the Attach Request does not include a service-location label request). The attach procedure further includes mobility controller 112 selecting the user plane anchor 160 for anchoring of CPE-1 134 or UE-1 154. In FIG. 5, the selected user plane anchor 160 is assumed to be UPA-1 164. Mobility controller 112 obtains an indication of the service chain 180 associated with UPA-1 164. The obtaining may include identifying the associated service chain as discussed above with reference to FIG. 3. In FIG. 5, it is assumed that the associated (e.g. closest) service chain 180 is service chain 1 184 in zone 1 102 and that the indication is indicative of location of service chain 1 184 by including service-location label "zone1". The attach procedure further includes mobility controller 112 sending in response an Attach Accept to CPE-1 134 or UE-1 154 which sent the Attach Request. The Attach Accept does not include the indication of the associated service chain 1 184.

Assuming that mobility controller 112 and UPA-1 164 are separately implemented, mobility controller 112 and UPA-1 164 then communicate (520) via an FPC interface protocol or any other appropriate interface protocol. Mobility controller 112 passes the indication to UPA-1 164 via the FPC interface protocol or via any other appropriate interface protocol. In such a manner, UPA-1 164 obtains the indication of the associated service chain 1 184 by receiving the indication. The obtaining of the indication by UPA-1 164 may be an example of stage 220 of method 200.

UPA-1 164 obtains (530) a prefix for CPE-1 134 or UE-1 154 statically or dynamically. For example, the prefix may be obtained statically from an HSS or a local pool. As another example, the prefix may be obtained dynamically from an external DHCPv6 server. In some embodiments more than one prefix may be obtained. However for simplicity's sake, call flow diagram 600 assumes that one prefix is obtained.

CPE-1 134 or UE-1 154 sends (540) a Router Solicitation to UPA-1 164.

UPA-1 164 sends (550) an RA to CPE-1 134 or UE-1 154. The RA includes other configuration flag (O-flag) set. The RA may include PIO(s) but the PIO(s) do not include any indication of the associated service chain 1 184.

Since the O-flag is set in the RA, CPE-1 134 or UE-1 154 determines (560) that stateless DHCPv6 should be used to receive the indication of the associated service chain 1 184.

Therefore, CPE-1 134 or UE-1 154 sends (570) a DHCPv6 Solicit to UPA-1 164.

UPA-1 164 sends (575) in response a DHCPv6 Advertise to CPE-1 134 or UE-1 154.

CPE-1 134 or UE-1 154 sends (580) to UPA-1 164 a DHCPv6 Information Request to request the indication (e.g. to request the service-location label) of the service chain 180 associated with UPA-1 164. The sending of the DHCPv6 Information Request may be an example of stage 230 of method 200.

UPA-1 164 sends (585) in response a DHCPv6 Reply to CPE-1 134 or UE-1 154. The DHCPv6 Reply includes the indication (e.g. including service-location label "zone1") of the associated service chain 1 184. It is noted that conventionally DHCPv6 information requests and replies may be used to receive other information but not to request and receive an indication of the service chain 180 (e.g. service chain 1 184) associated with the user plane anchor 160 (e.g. UPA-1 164). The sending of the DHCPv6 reply may be an example of stage 240 of method 200.

CPE-1 134 or UE-1 154 receives the DHCPv6 reply and thereby receives the indication (e.g. including service-location label "zone1") of associated service chain 1 184. The indication is piggybacked to the prefix in the DHCPv6 reply, or in other words sent and received as metadata associated with the prefix. The receiving may be an example of stage 250 of method 200.

Figure 6:
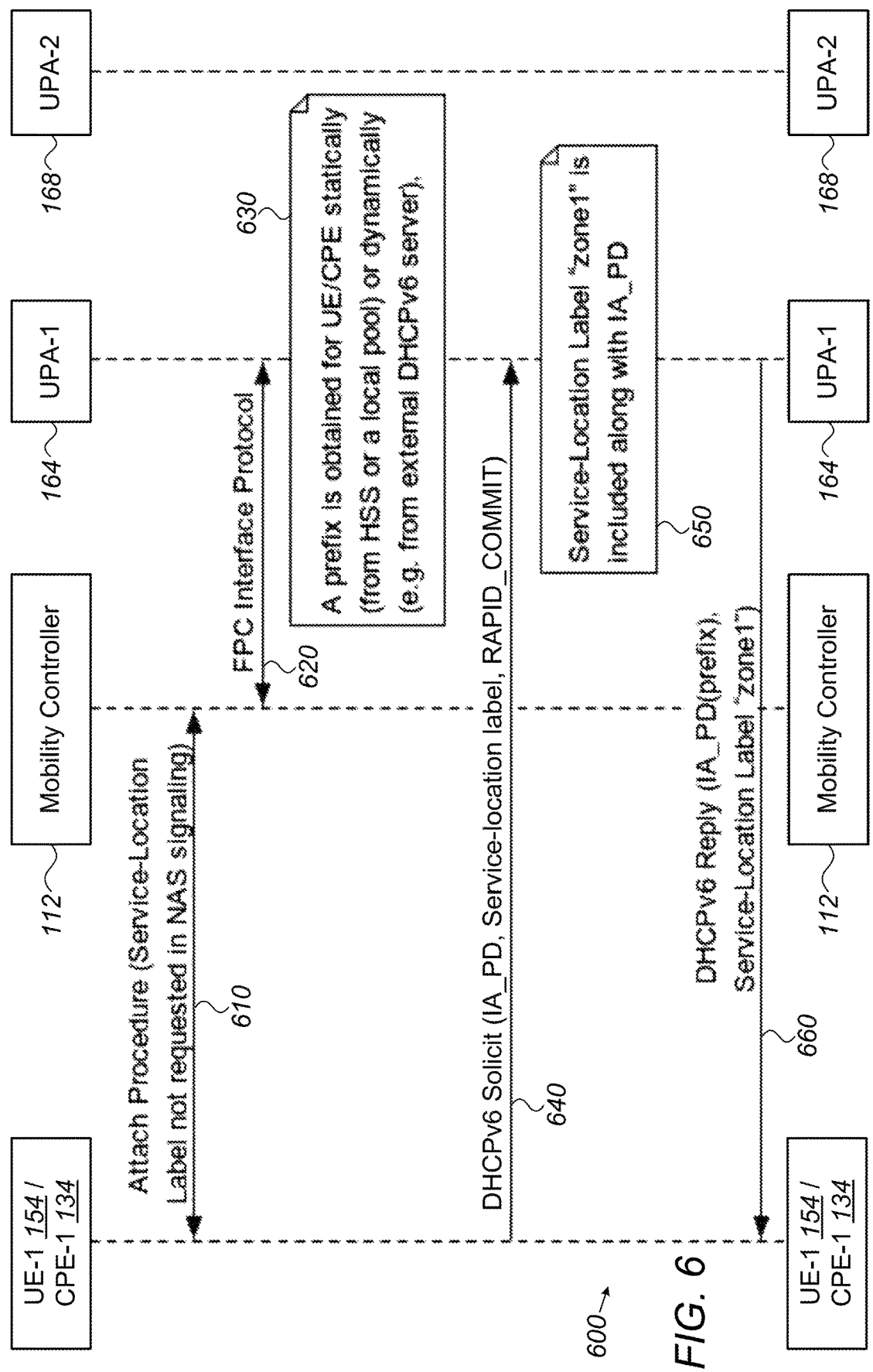
FIG. 6 is a call flow diagram illustrating a stateful dynamic host configuration protocol version 6 procedure, in accordance with some embodiments of the presently disclosed subject matter.

FIG. 6 is a call flow diagram 600, in accordance with some embodiments of the presently disclosed subject matter. Call flow diagram 600 is used to illustrate another example of stages 220 to 250 of method 200. Call flow diagram 600 is described with reference to CPE-1 134 or UE-1 154 as an example of the receiving apparatus discussed in method 200, and with reference to UPA-1 164 and UPA-2 168. In FIG. 6, an apparatus that implements UPA-1 164 is an example of the sending apparatus discussed with reference to method 200. However, it should be evident that call flow diagram 600 may be applied, mutatis mutandis, to any CPE 130, UE 150 or UPA 160. Call flow diagram 600 allows CPE-1 134 or UE-1 154 to receive an indication of the associated service chain 180 via stateful DHCPv6.

An attach procedure is performed (610) by CPE-1 134 or UE-1 154 and mobility controller 112. The attach procedure includes CPE-1 134 or UE-1 154 sending an Attach Request to mobility controller 112. However, the Attach Request does not request any indication of the service chain 180 associated with the user plane anchor 160 to which CPE-1 134 or UE-1 154 will be anchored (e.g. does not include a service-location label request). The attach procedure further includes mobility controller 112 selecting the user plane anchor 160 for anchoring of CPE-1 134 or UE-1 154. In FIG. 6, the selected user plane anchor 160 is UPA-1 164. Mobility controller 112 obtains an indication of the service chain 180 associated with UPA-1 164. The obtaining may include identifying the associated service chain 180 as discussed above with reference to FIG. 3. In the example of FIG. 6, it is assumed that the associated (e.g. closest) service chain 180 is service chain 1 184 in zone 1 102 and that the indication is indicative of location of service chain 1 184 by including service-location label "zone1". The attach procedure further includes mobility controller 112 sending in response an Attach Accept to CPE-1 134 or UE-1 154 which sent the Attach Request. The Attach Accept does not include the indication of the associated service chain 1 184.

Assuming that mobility controller 112 and UPA-1 164 are separately implemented, mobility controller 112 and UPA-1 164 then communicate (620) via an FPC interface protocol or any other appropriate interface protocol. Mobility controller 112 passes the indication to UPA-1 164 via the FPC interface protocol or via any other appropriate interface protocol. In such a manner, UPA-1 164 obtains the indication of the associated service chain 1 184 by receiving the indication. The obtaining of the indication by UPA-1 164 may be an example of stage 220 of method 200.

UPA-1 164 obtains (630) a prefix for CPE-1 134 or UE-1 154 statically or dynamically. For example, the prefix may be obtained statically from an HSS or a local pool. As another example, the prefix may be obtained dynamically from an external DHCPv6 server. In some embodiments, more than one prefix may be obtained. However for simplicity's sake, the description of call flow diagram 600 assumes that one prefix is obtained.

CPE-1 134 or UE-1 154 then sends (640) a DHCPv6 Solicit. The DHCPv6 solicit may include an Identity Association for Prefix Delegation (IA PD), a request for the indication (e.g. a request for the service-location label) of the service chain 180 associated with UPA-1 164, and a RAPID_COMMIT to enable a two message exchange rather than a four message exchange. The inclusion of the IA PD enables CPE-134 to optionally delegate (or in other words carve out) one or more prefixes to one or more hosts 140 from the prefix that will be received in 660. See for example, discussion of FIGS. 8 and 9 below. (CPE-1 134 or UE-1 154 may additionally or alternatively keep at least part of the prefix that will be received in 660 for its own use.) The sending of the DHCPv6 solicit may be an example of stage 230 of method 200.

UPA-1 164 includes (650) the indication of the service chain 1 184 associated with UPA-1 164 in a DHCPv6 reply, in addition to the IA PD.

UPA-1 164 sends (660) the DHCPv6 reply to CPE-1 134 or UE-1 154. The DHCPv6 reply includes the prefix obtained in 630 and the indication (e.g. including service-location label "zone1") of the associated service chain 1 184. The sending of the DHCPv6 reply may be an example of stage 240 of method 200.

CPE-1 134 or UE-1 154 receives the DHCPv6 reply and thereby receives the indication of the associated service chain 1 184 (e.g. including service-location label "zone1"). The indication is piggybacked to the prefix in the DHCPv6 reply, or in other words sent and received as metadata associated with the prefix. The receiving may be an example of stage 250 of method 200.

Figure 7:
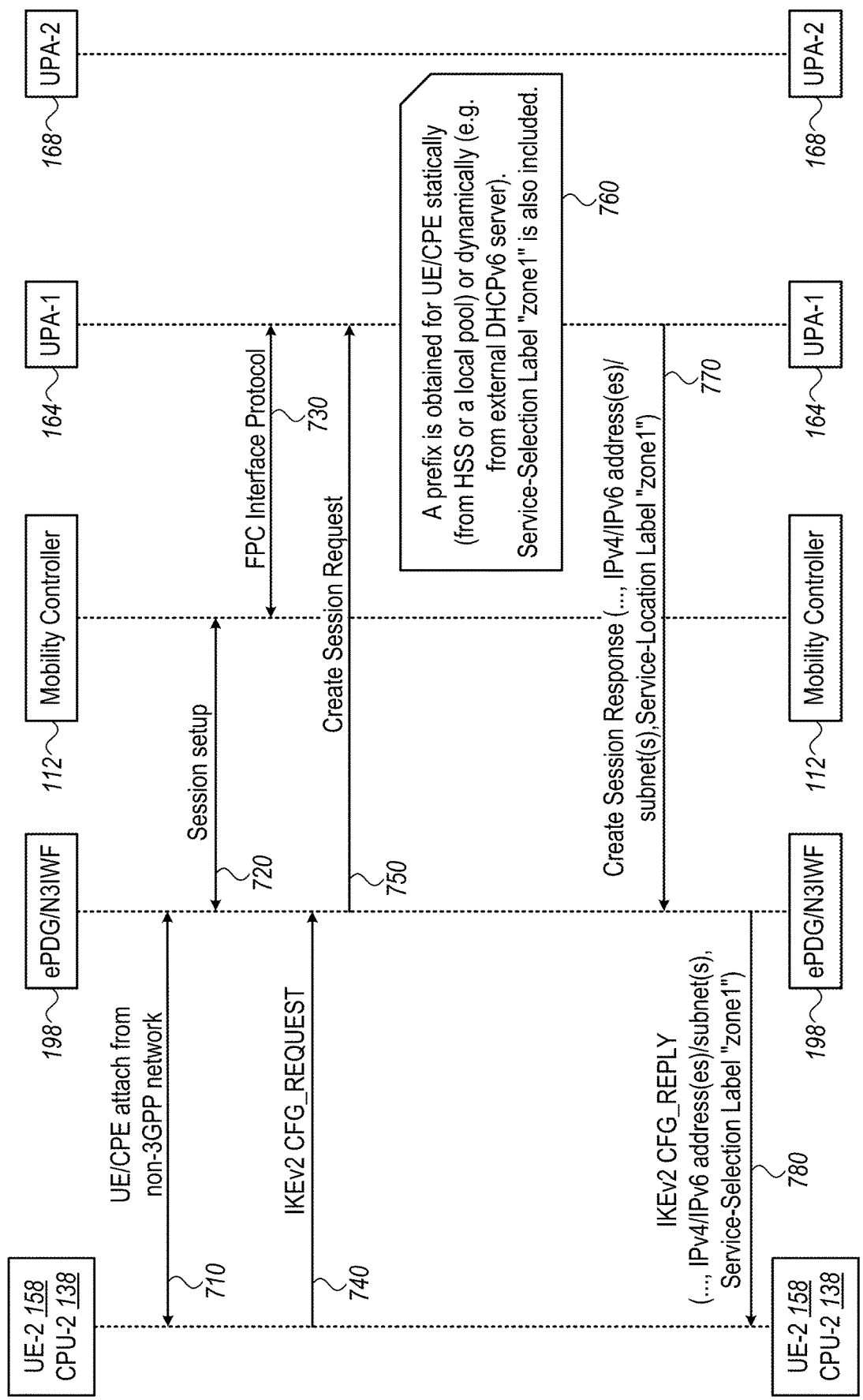
FIG. 7 is a call flow diagram illustrating an Internet key exchange version 2 procedure, in accordance with some embodiments of the presently disclosed subject matter.

FIG. 7 is a call flow diagram 700, in accordance with some embodiments of the presently disclosed subject matter. Call flow diagram 700 is used to illustrate another example of stages 220 to 250 of method 200. Call flow diagram 700 is described with reference to CPE-2 138 or UE-2 158 as an example of the receiving apparatus discussed in method 200, and with reference to UPA-1 164 and UPA-2 168. However, it should be evident that call flow diagram 700 may be applied, mutatis mutandis, to any CPE 130, UE 150 or UPA 160. In FIG. 7, the apparatus that implements ePDG/N3IWF 198 is an example of the sending apparatus discussed with reference to method 200. Call flow diagram 700 allows CPE-2 138 or UE-2 158 to receive an indication of the associated service chain 180 via Internet Key Exchange version 2 (IKEv2). IKEv2 is an example of a mechanism for delivering IP configuration parameters.

CPE-2 138 or UE-2 158 attaches (710) via a non-3GPP network to ePDG/N3IWF 198. ePDG/N3IWF 198 may reside, for instance, between CPE-2 134 or UE-2 158 and UPA-1 164 (see FIG. 1).

ePDG/N3IWF 198 and mobility controller 112 set up (720) a session.

Mobility controller 112 selects UPA-1 164 as the user plane anchor 160 and obtains an indication of the service chain 180 associated with UPA-1 164. The obtaining may include identifying the associated service chain as discussed above with reference to FIG. 3. In FIG. 7, it is assumed that the associated (e.g. closest) service chain 180 is service chain 1 184 in zone 1 102 and that the indication is indicative of location of service chain 1 184 by including service-location label "zone1".

Assuming that mobility controller 112 and UPA-1 164 are separately implemented, mobility controller 112 and UPA-1 164 then communicate (730) via an FPC interface protocol or any other appropriate interface protocol. Mobility controller 112 passes the indication of the associated service chain 1 184 to UPA-1 164 via the FPC interface protocol or via any other appropriate interface protocol.

CPE-2 138 or UE-2 158 sends (740) an IKEv2 configuration (CFG) request to ePDG/N3IWF 198. The sending may be an example of stage 230 of method 200. In FIG. 7 the CFG request does not request any indication of the service chain 180 associated with UPA-1 184, but in other embodiments, the CFG request may request an indication of the associated service chain 180.

ePDG/N3IWF 198 sends (750) a Create Session Request to UPA-1 164.

UPA-1 164 obtains (760) a prefix for CPE-1 134 or UE-1 154 statically or dynamically. For example, the prefix may be obtained statically from an HSS or a local pool. As another example, the prefix may be obtained dynamically from an external DHCPv6 server. In some embodiments more than one prefix may be obtained. However for simplicity's sake call flow diagram 700 assumes that one prefix is obtained.

UPA-1 sends (770) a Create Session Response to ePDG/N3IWF 198. The Create Session Response includes IP address(es) (e.g. IPv4 address(es), IPv6 address(es)) and/or subnet(s) in addition to the indication of the associated service chain 1 184. ePDG/N3IWF 198 thereby obtains the indication of the associated service chain 1 184, by receiving the indication. The obtaining by ePDG/N3IWF 198 may be an example of stage 220 of method 200.

ePDG/N3IWF sends (780) an IKEv2 CFG Reply to CPE-1 134 or UE-1 154. The reply includes the IP address(es) and/or subnet(s) and the indication (e.g. including service-location label "zone1") of the associated service chain 1 184, thereby providing the indication of the associated service chain 1 184 to CPE-1 134 or UE-1 154. The sending of the IKEv2 CFG Reply may be an example of stage 240 of method 200. CPE-1 134 or UE-1 154 receiving the indication (e.g. including service-location label "zone1") of the associated service chain 1 184 may be an example of stage 250 of method 200. In the IKEv2 CFG Reply the indication is piggybacked to the address(es)/subnet(s), or in other words sent and received as metadata associated with the address(es)/subnet(s).

Figure 8:
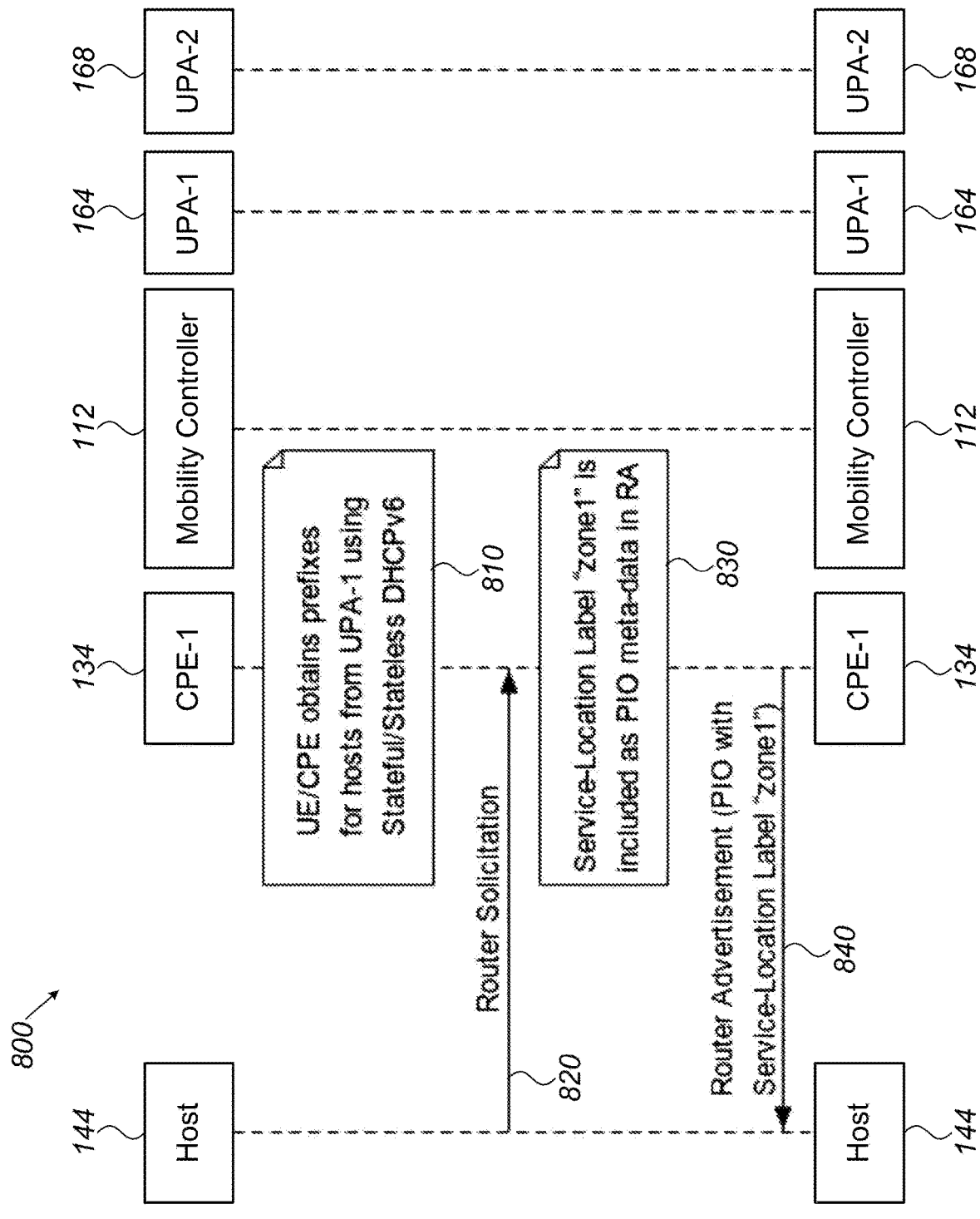
FIG. 8 is a call flow diagram illustrating another stateless address autoconfiguration procedure, in accordance with some embodiments of the presently disclosed subject matter.

FIG. 8 is a call flow diagram 800, in accordance with some embodiments of the presently disclosed subject matter. Call flow diagram 800 is used to illustrate another example of stages 220 to 250 of FIG. 2. Call flow diagram 800 is described with reference to host 1 144 as the receiving apparatus, with reference to CPE-1 134 as the sending apparatus, and with reference to UPA-1 164 and UPA-2 168. However, it should be evident that call flow diagram 800 may be applied, mutatis mutandis, to any host 140, CPE 130, or UPA 160. Call flow diagram 800 allows host 1 144 to receive an indication of the associated service chain 180 using SLAAC.

CPE-1 134 obtains (810) prefix(es) from UPA-1 164 for delegation to host(s) as described above with reference to call flow diagram 600. Note that 4G technology allows prefix delegation with stateful DHCPv6. However, if 5G technology allows prefix delegation with stateful or stateless DHCPv6, then the obtaining of 810 may be as described in call flow diagram 600 or 500.

Host 1 144, which is behind CPE-1 134 sends (820) a Router Solicitation to CPE-1 134. The Router Solicitation does not request any indication of the service chain 180 associated with UPA-1 164 to which CPE-1 134 is anchored. The sending of the Router Solicitation may be an example of stage 230 of method 200.

CPE-1 134 includes (830) in an RA an indication of service chain 1 184 associated with UPA-1 164 (e.g. an indication indicative of the location of service chain 1 184 such as an indication including service-location label "zone1"). The indication is included in the RA as PIO metadata, associated with the prefix(es) that are being delegated to host 1 144. The indication may have been obtained earlier by CPE-1 134, for example by way of receiving the DHCPv6 reply in 660 (FIG. 6). The obtaining of the indication of associated service chain 1 184 by CPE-1 134 may be an example of stage 220 of method 200.

CPE-1 134 sends (840) the RA to host 1 144. The RA includes the indication (e.g. including service-location label "zone1) of service chain 1 184 associated with UPA-1 164 as PIO metadata. Host 1 144 thereby receives the indication of service chain 1 184 associated with UPA-1 164. The sending and receiving may be examples of stages 240 and 250 respectively of method 200. The indication is piggybacked to the prefix(es) in the RA, or in other words sent and received as metadata to the prefix(es).

Figure 9:
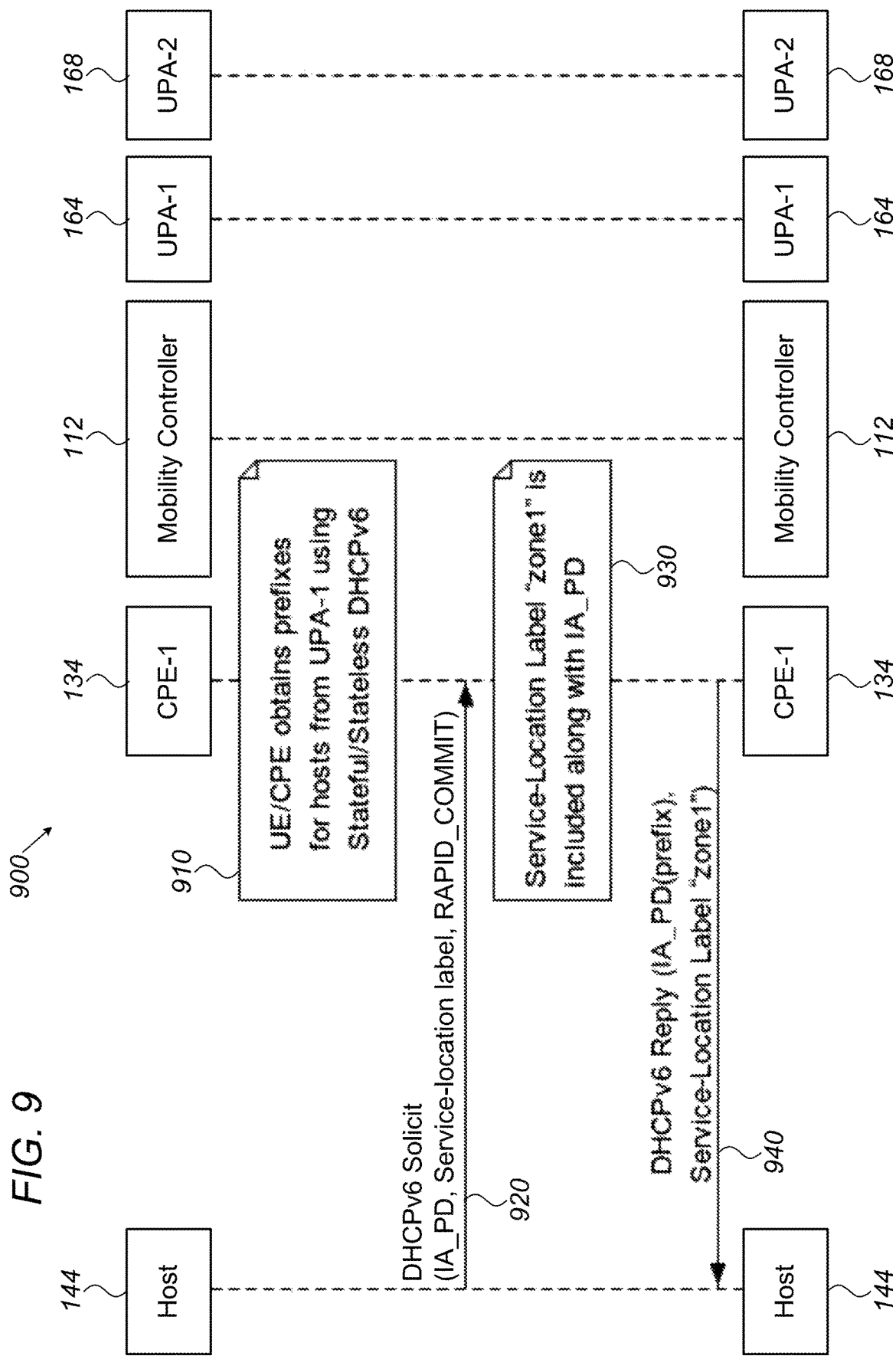
FIG. 9 is a call flow diagram illustrating a stateful dynamic host configuration protocol version 6 procedure with prefix delegation extensions, in accordance with some embodiments of the presently disclosed subject matter.

FIG. 9 is a call flow diagram 900, in accordance with some embodiments of the presently disclosed subject matter. Call flow diagram 900 is used to illustrate another example of stages 220 to 250 of FIG. 2. Call flow diagram 900 is described with reference to host 1 144 as the receiving apparatus, with reference to CPE-1 134 as the sending apparatus, and with reference to UPA-1 164 and UPA-2 168. However, it should be evident that call flow diagram 900 may be applied, mutatis mutandis, to any host 140, CPE 130, or UPA 160. Call flow diagram 900 allows host 1 144 to receive an indication of the associated service chain 180 using DHCPv6.

CPE-1 134 obtains (910) prefix(es) from UPA-1 164 for delegation to host(s) as described above with reference to call flow diagram 600. Note that 4G technology allows prefix delegation with stateful DHCPv6. However, if 5G technology allows prefix delegation with stateful or stateless DHCPv6, then the obtaining in 910 may be as described in call flow diagram 600 or 500.

Host 1 144, which is behind CPE-1 134 sends (920) a DHCPv6 Solicit. The DHCP Solicit may include an IA PD, a request for an indication (e.g. a request for a service-location label) of the service chain 180 associated with UPA-1 164, and a RAPID_COMMIT. The sending of the DHCP Solicit may be an example of stage 230 of method 200.

CPE-1 134 includes (930) the indication (e.g. including service-location label "zone1) of associated service chain 1 184 in a DHCPv6 reply, along with the IA PD. The indication may have been obtained earlier by CPE-1 134, for example by way of receiving the DHCPv6 reply in 660 (FIG. 6). The obtaining of the indication by CPE-1 134 may be an example of stage 220 of method 200.

In response to the DHCPv6 Solicit of 920, CPE-1 134 sends (940) a DHCPv6 Reply to host 1 144. It is assumed in FIG. 9 that one prefix is being delegated to host 1 144. The DHCPv6 Reply includes the prefix being delegated to host 1 144 and the indication (e.g. including service-location label "zone1") of associated service chain 1 184. Host 1 144 thereby receives the indication of service chain 1 184 associated with UPA-1 164. The sending and receiving may be examples of stages 240 and 250 respectively of method 200. The indication is piggybacked to the prefix in the DHCPv6 Reply, or in other words sent and received as metadata associated with the prefix.

Figure 10:
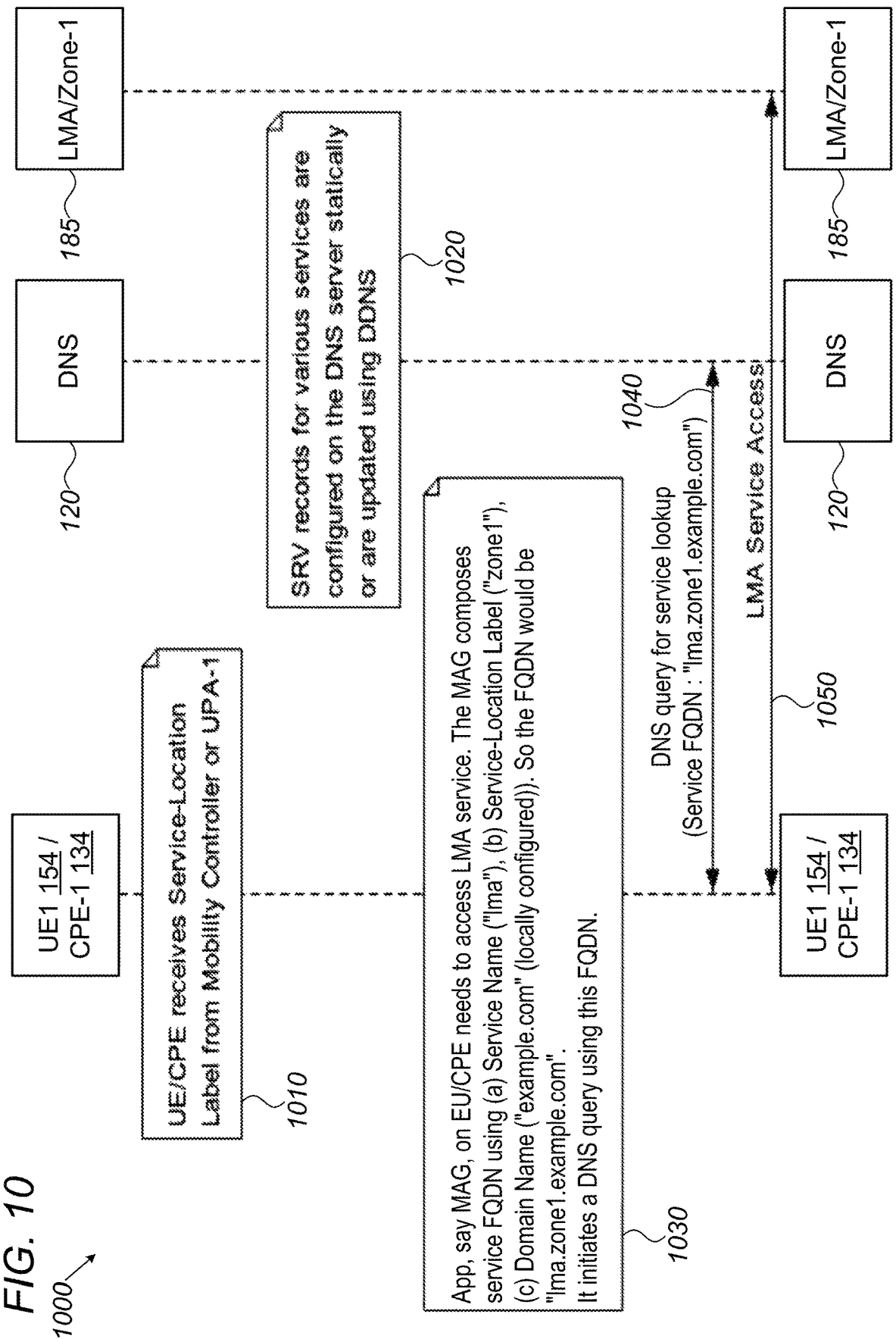
FIG. 10 is a call flow diagram illustrating a directory query procedure, in accordance with some embodiments of the presently disclosed subject matter.

FIG. 10 is a call flow diagram 1000, in accordance with some embodiments of the presently disclosed subject matter. Call flow diagram 1000 is used to illustrate an example of stages 210, 250 and 260, where the receiving apparatus is CPE-1 134 or UE-1 154. It is further assumed that UPA-1 164 is the user plane anchor 160 used for anchoring CPE 1-134 or UE-154, and that service chain 1 184 in zone 1 102 is the service chain 180 associated with UPA-1 164. The service function instance of interest is assumed to be an LMA service function instance (e.g. more specifically LMA service function 185 in service chain 1 184). However, it should be evident that call flow diagram 1000 may be applied, mutatis mutandis, to any CPE 130, UE 150, UPA 160, service chain 180, or service function instance.

CPE-1 134 or UE-1 154 receives (1010) the indication of service chain 1 184 associated with UPA-1 164, e.g. the indication including the service-location label "zone1", from mobility controller 112, from UPA-1 164 or from ePDG/N3IWF 198 as described above with reference to call flow diagram 300, 400, 500, 600 or 700 (assuming the replacement of UE-1 154 or CPE-1 134 in call flow diagram 700 in the place of UE-2 158 or CPE-2 138). The indication that is received is indicative of the location of service chain 1 184, e.g. by including the service-location label "zone1". The receiving may be an example of stage 250.

DNS service records for various service function instances are configured (1020) on DNS server 140 statically (e.g. initially) and/or dynamically (e.g. when updating the records). The DNS service record for any service function instance may include, for instance, the service FQDN and the IP address. The configuration may be an example of stage 210. The service FQDN for LMA service function 185, for instance, may be as described in 1030 below.

CPE-1 134 or UE-1 154 (e.g. more specifically an application on CPE-1 134 or UE-1 154), uses the indication to construct a DNS query. More specifically, for instance, CPE-1 134 or UE-1 154 may use the indication to compose (1030) a service FQDN for a service function instance (e.g. LMA service function 185) and may initiate a DNS query using the service FDQN. For example, the application on CPE-1 134 or UE-1 154 which constructs the query may be a MAG which needs to access an LMA service function. The service FQDN may comprise, for instance, data indicative of the service function such as the service function name (e.g. "lma"); the indication that was previously received, indicative of the location of service chain 1 184 associated with UPA-1 164 (e.g. the indication including service-location label "zone1"); and a domain name that is locally configured for the wireless service provider (e.g. "example.com") that is associated with the location (e.g. associated with zone 1 102). Continuing with describing such an example, the FQDN may be "lma.zone1.example.com".

CPE-1 134, or UE-1 154 and DNS server 120 communicate (1040) regarding service lookup. CPE-1 134, or UE-1 154 sends a DNS query such as "Service FQDN: "lma.zone1.example.com". DNS server 120 finds the DNS service record which includes the service FQDN and responds to the query with the IP address of the server providing the lma service function in service chain 1 184 in zone 1 102 (i.e. the server providing LMA service function 185). CPE-1 134 or UE-1 154 thereby receives the IP address.

CPE 1-134 or UE-154 then communicates (1050) with the server providing LMA service function 185, sending packet(s) via UPA-1 164 to the IP address of the server providing LMA service function 185. The composition of the service FQDN 1030, the communication regarding service lookup 1040, and the communication 1050 with the server may be an example of stage 260 of method 200 (e.g. more specifically of stage 264 of method 200).

Figure 11:
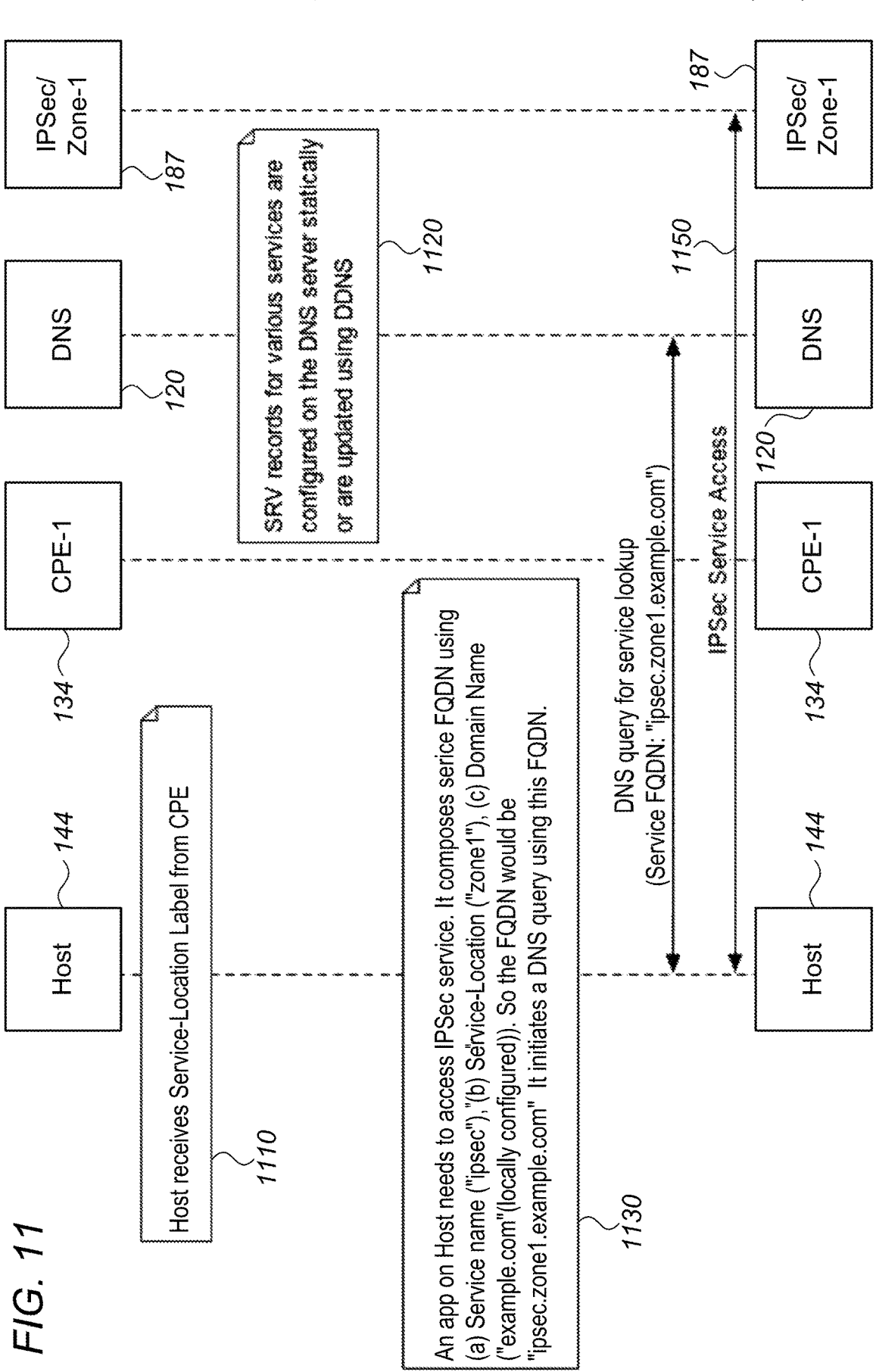
FIG. 11 is a call flow diagram illustrating another directory query procedure, in accordance with some embodiments of the presently disclosed subject matter.

FIG. 11 is a call flow diagram 1100, in accordance with some embodiments of the presently disclosed subject matter. Call flow diagram 1100 is used to illustrate an example of stages 210, 250 and 260, where the receiving apparatus is host 1 144. It is further assumed that UPA-1 164 is the user plane anchor 160 anchoring CPE 1-134 behind which is host 1 144, and that service chain 1 184 in zone 1 102 is the service chain 180 associated with UPA-1 164. The service function of interest is assumed to be an IPsec service function instance (e.g. more specifically IPsec service function 187 in service chain 1 184). However, it should be evident that call flow diagram 1100 may be applied, mutatis mutandis, to any host 140, UPA 160, service chain 180, or service function instance.

Host 1 144 receives (1110) the indication of service chain 1 184 associated with UPA-1 164, e.g. receives the service-location label "zone1", from CPE-1 134. Host 1 144 may have received the service-location label as described in call flow diagram 800 or 900. The indication is indicative of the location of service chain 1 184. The receiving may be an example of stage 250.

DNS service records for various service function instances are configured (1120) on DNS server 140 statically (e.g. initially) and/or dynamically (e.g. when updating the records). The DNS service record for any service function instance may include, for instance, the service FQDN and the IP address. The configuration may be an example of stage 210. The service FQDN for IPSec service function 187, for instance, may be as described in 1130 below.

Host 1 144 (e.g. more specifically an application on host 1 144) uses the indication to construct a DNS query. More specifically, for instance, host 1 144 may use the indication to compose (1130) a service FQDN for a service function instance (e.g. IPsec service function 187) and may initiate a DNS query that includes the FDQN. For example, the application on host 1 144 which constructs the query may need to access an IPSec service function. The service FQDN may comprise, for instance, data indicative of the service function such as the service function name (e.g. "ipsec"); the indication that was previously received, indicative of the location of service chain 1 184 associated with UPA-1 164 (e.g. the indication including service-location label "zone1"); and a domain name that is locally configured for the wireless service provider (e.g. "example.com") associated with the location (e.g. associated with zone 1). Continuing with describing such an example, the FQDN may be "ipsec.zone1.example.com".

Host 1 144 and DNS server 120 communicate (1140) regarding service lookup. Host 1 144 sends a DNS query such as "Service FQDN: "ipsec.zone1.example.com". DNS server 120 finds the DNS service record which includes the service FQDN and responds to the query with the IP address of the server providing the IPSec service function in service chain 1 184 in zone 1 102 (i.e. the server providing IPSec service function 187).

Host 1 144 then communicates (1150) with the server providing the IPSec service 187, sending packet(s) via UPA-1 164 to the IP address of the server providing IPSec service 187. The composition of the service FQDN 1130, the communication regarding service lookup 1140, and the communication 1150 with the server may be an example of stage 260 of method 200 (e.g. more specifically of stage 264 of method 200).

Figure 12:
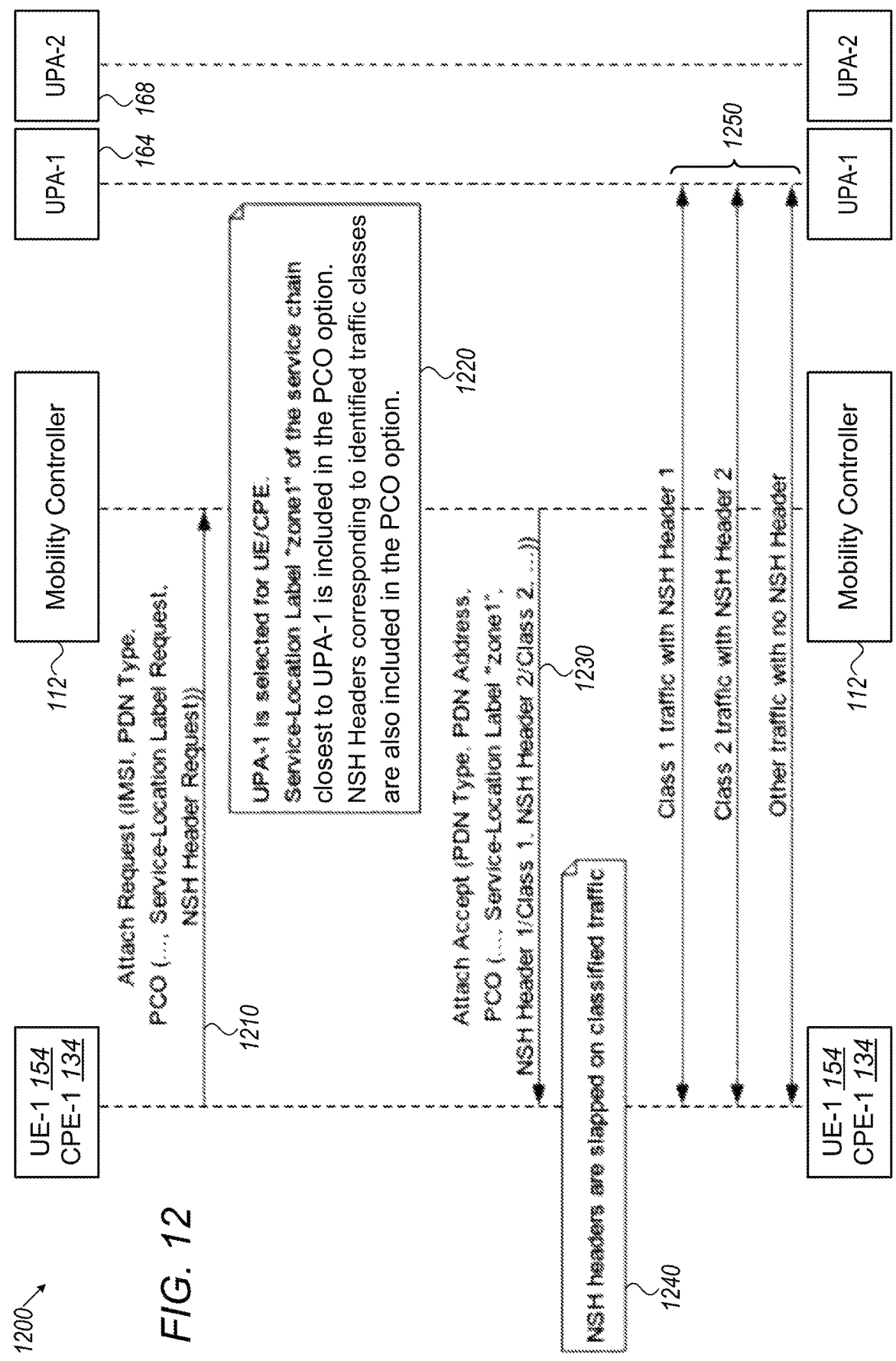
FIG. 12 is a call flow diagram illustrating a network service header procedure, in accordance with some embodiments of the presently disclosed subject matter.

FIG. 12 is a call flow diagram 1200, in accordance with some embodiments of the presently disclosed subject matter. Call flow diagram 1200 is used to illustrate an example of stages 220 to 260 of method 200. Call flow diagram 1200 is described with reference to CPE-1 134 or UE-1 154 as an example of the receiving apparatus discussed in method 200, and with reference to UPA-1 164 and UPA-2 168. However, it should be evident that call flow diagram 1200 may be applied, mutatis mutandis, to any CPE 130, UE 150 or UPA 160. Call flow diagram 1200 allows CPE-1 134 or UE-1 154 to receive an indication of the associated service chain 180 via NAS signaling during session establishment. For call flow diagram 1200, the apparatus that implements mobility controller 112 is an example of the sending apparatus discussed with reference to method 200.

As part of NAS signaling, CPE-1 134 or UE-1 154 sends (1210) an Attach Request to mobility controller 112. The Attach Request includes an IMSI, a PDN type, and a PCO. In call flow diagram 1200, the PCO includes a service-location label request, as discussed above, and an NSH header request. Alternatively, the PCO may include an NSH header request but not a service-location label request. The sending of the Attach Request may be an example of stage 230 of method 200.

Mobility controller 112 selects (1220) UPA-1 164 as the user plane anchor 160 for anchoring CPE-1 134 or UE-1 154. Mobility controller obtains an indication of the service chain 180 associated with UPA-1 164. The obtaining may include identifying the associated service chain 180 (assumed to be service chain 1 184) as discussed above with reference to FIG. 3. For example, the indication may include one or more NSH headers corresponding to one or more classes of packet traffic. Such an indication may be indicative of the associated service chain 1 184, because each NSH header is indicative of one or more service functions in service chain 1 184. The traffic class(es) may include any appropriate class(es) of traffic such as HTTP traffic, RTP traffic, traffic relating to a specific host 140, etc. Optionally, the indication is also indicative of the location of the associated service chain 180, such as by including service-location label "zone1, because service chain 1 184 is in zone 1 102. The obtaining of the indication may be an example of stage 220 of method 200.

Mobility controller 112 sends (1230) an Attach Accept to CPE-1 134 or UE-1 154. The Attach Accept includes the PDN type, the PDN address, and the PCO. The PCO includes the indication of associated service chain 1 184. The indication includes NSH header(s) for one or more traffic class(es) (e.g. for class 1, class 2, etc.) and is optionally also indicative of the location of associated service chain 1 184 (e.g. by including service-location label "zone1"). The Attach Accept is received by CPE-1 134 or UE-1 154. The sending and receiving of the Attach Accept may be examples of stage 240 and 250 respectively.

CPE-1 134 or UE-1 154 slaps (1240) (i.e. adds) NSH header(s), that were included in the indication, on packet(s) associated with the traffic class(es). For example, CPE-1 134 or UE-1 154 may classify packet(s) into traffic class(es) and add to the packet(s) respective NSH header(s) for the traffic class(es) associated with the packet(s). No NSH header need be added to packets, if any, that are not classified to a traffic class associated with an NSH header. The packet(s) to which the NSH header(s) are added may have originated in CPE-1 134, UE-1 154, and/or in any host behind CPE-1 134.

CPE-1 134 or UE-1 154 sends (1250) packet(s) with NSH header(s) and optionally packet(s) without any NSH header. The addition of NSH header(s) to packet(s) and the sending of the packet(s) with the NSH header(s) may be an example of stage 260 of method 200 (e.g. more specifically of stage 268 of method 200). Such packet(s) are received via UPA-1 164 at the appropriate service function instance(s) of associated service chain 1 184, in accordance with the respective NSH headers.

Figure 13:
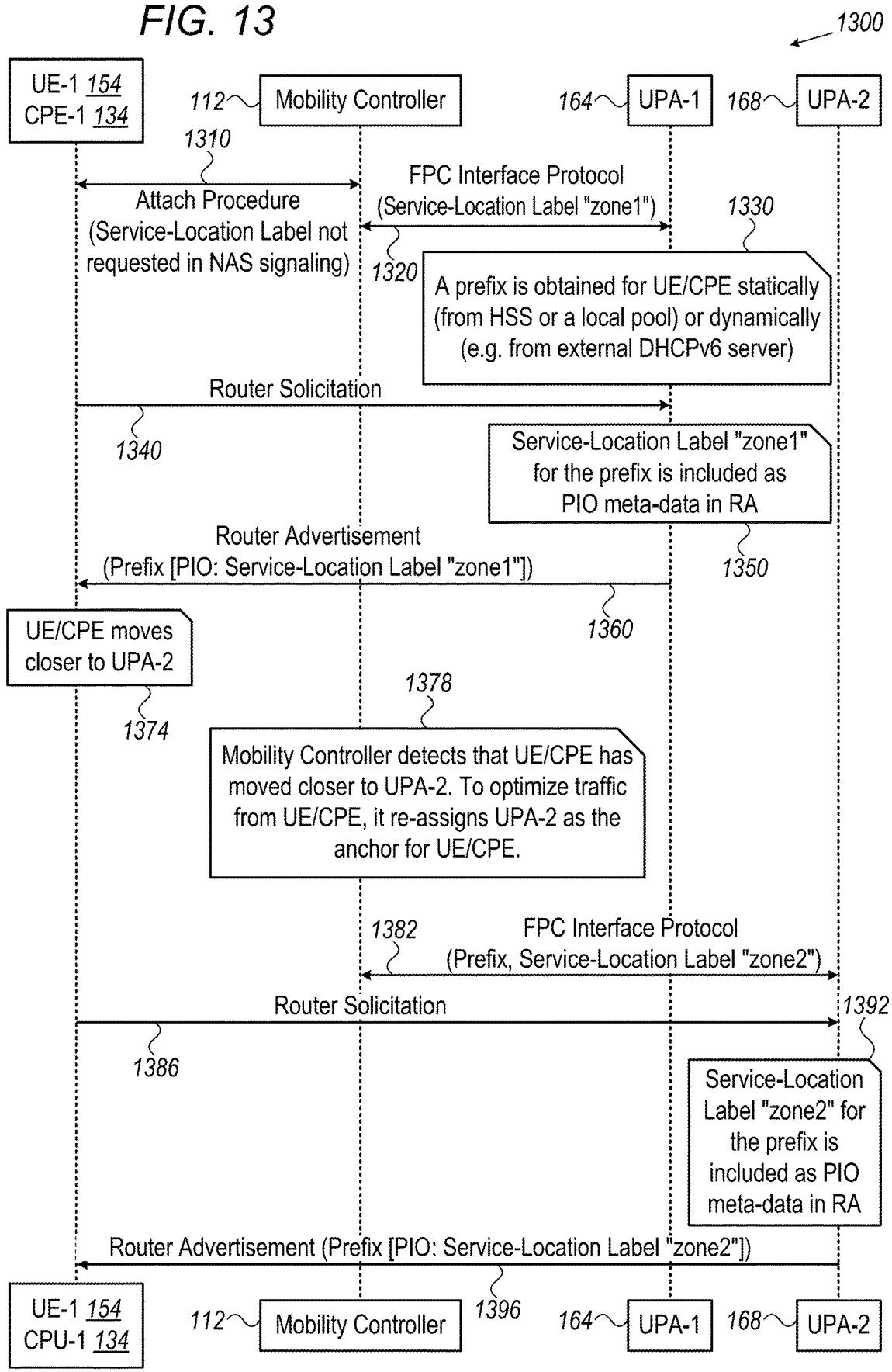
FIG. 13 is a call flow diagram illustrating a re-anchoring procedure, in accordance with some embodiments of the presently disclosed subject matter.

FIG. 13 is a call flow diagram 1300, in accordance with some embodiments of the presently disclosed subject matter. Call flow diagram 1300 is an example of stages 220 to 250 and of stage 270 of method 200.

It is assumed that in 1310 to 1360 SLAAC is used, similarly to the discussion of 410 to 460 of call flow diagram 400 (FIG. 4). However, instead of two prefixes being used, as per call flow diagram 400, one prefix is assumed to be used in call flow diagram 1300. See above description of call flow diagram 400. Accordingly, in 1310 to 1360 the apparatus that implements UPA-1 164 may be an example of the sending apparatus discussed in method 200; and CPE-1 134 or UE-1 154 may be an example of the receiving apparatus discussed in method 200. The receiving in stage 1320 by UPA-1 164 may be an example of stage 220 of method 200. The sending of Router Solicitation 1340 may be an example of stage 230 of method 200. The sending and receiving of RA 1360 may be an example of stage 240 and 250 respectively of method 200.

CPE-1 134 or UE-1 154 then moves (1374) closer to UPA-2 168. CPE-1 134 or UE-1 154, mobility controller 112 and UPA-2 may therefore attempt to repeat the SLAAC procedure as before.

Mobility controller 112 detects (1378) that CPE-1 134 or UE-1 154 has moved closer to UPA-2 168. To optimize packet(s) from CPE-1 134 or UE-1 154, mobility controller 112 selects UPA-2 168 as the user plane anchor 160 for CPE-1 134 or UE-1 154 (i.e. selects UPA-2 168 for a re-anchoring of CPE-1 134 or UE-1 154, or in other words re-assigns UPA-2 168 as the anchor). The selection of UPA-2 168 as the user plane anchor 160 for CPE-1 134 or UE-1 154 may be an example of a "yes" for stage 270 of method 200. The remainder of call flow diagram 1300 may therefore correspond to another (e.g. current in the language of FIG. 2) iteration of stages 210 through 250. In the current iteration the apparatus implementing UPA-2 168 may be an example of the sending apparatus, and CPE-1 134 or UE 154 may be an example of the receiving apparatus.

Mobility controller 112 obtains an indication ("the updated indication") of the service chain 180 associated with UPA-2 168. The obtaining may include identifying the associated service chain 180 as discussed above with reference to FIG. 3. It is assumed that the service chain 180 associated with UPA-2 168 is service chain 2 188 in zone 2 104 and that the updated indication is indicative of location of service chain 2 188 by including the service-location label "zone2".

Assuming that mobility controller 112 and UPA-2 168 are separately implemented, mobility controller 112 and UPA-2 168 then communicate (1382) via an FPC interface protocol or any other appropriate interface protocol. Mobility controller 112 passes the updated indication obtained in 1378, and the prefix obtained in 1330 (or a different prefix), to UPA-2 168 via the FPC interface protocol or via any other appropriate interface protocol. UPA-2 168 thereby obtains the updated indication by way of receiving the updated indication. The obtaining of the updated indication (e.g. including service-location label "zone2") by UPA-2 168 may be an example of the current iteration of stage 220 of method 200.

CPE-1 134 or UE-1 154 sends (1386) a Router Solicitation to UPA-2 168. The Router Solicitation does not request any updated indication of the service chain 180 associated with UPA-2 168. The sending of the Router Solicitation may be an example of the current iteration of stage 230 of method 200.

UPA-2 168 includes (1392) as PIO metadata in an RA the updated indication of service chain 2 188 associated with UPA-2 168 (e.g. including service-location label "zone2").

UPA-2 168 sends (1396) the RA to CPE-1 134 or UE-1 154. The RA includes the updated indication of service chain 2 188 associated with UPA-2 168 as PIO metadata. CPE-1 134 or UE-1 154 receives the RA and thereby receives the updated indication of service chain 2 188 associated with UPA-2 168. The sending and receiving of the RA may be examples of the current iteration of stages 240 and 250 respectively of method 200. The updated indication is piggybacked to the prefix in the RA, or in other words sent and received as metadata associated with the prefix.

In some embodiments, 1374 to 1396 may be repeated a plurality of times during a session where CPE-1 134 or UE-1 154 is connected to network 100.

In some embodiments, if another procedure (e.g. DHCPv6, IKEv2, NAS, etc.) was used for receiving the indication during the anchoring of CPE-1 134 or UE-1 154 in 1340 to 1360 instead of a SLAAC procedure, then the re-anchoring may repeat the other procedure, instead of performing 1386 to 1396.

Additionally or alternatively, in some embodiments, a different procedure may be performed for a re-anchoring than was performed for a previous anchoring (e.g. SLAAC for the anchoring and then DHCPv6 for the re-anchoring; DHCPV6 for the anchoring and then SLAAC for the re-anchoring, etc.)

The above call flow diagrams 300 to 1300 provide some examples of the various stages of method 200. Other appropriate call flow diagrams may be generated to provide additional examples of the various stages of method 200. Additionally or alternatively, call flow diagrams 300 to 1300 may be adjusted as appropriate (e.g. by adding, deleting, or replacing parts of the diagrams) in order to provide additional examples of the various stages of method 200.

Figure 14:
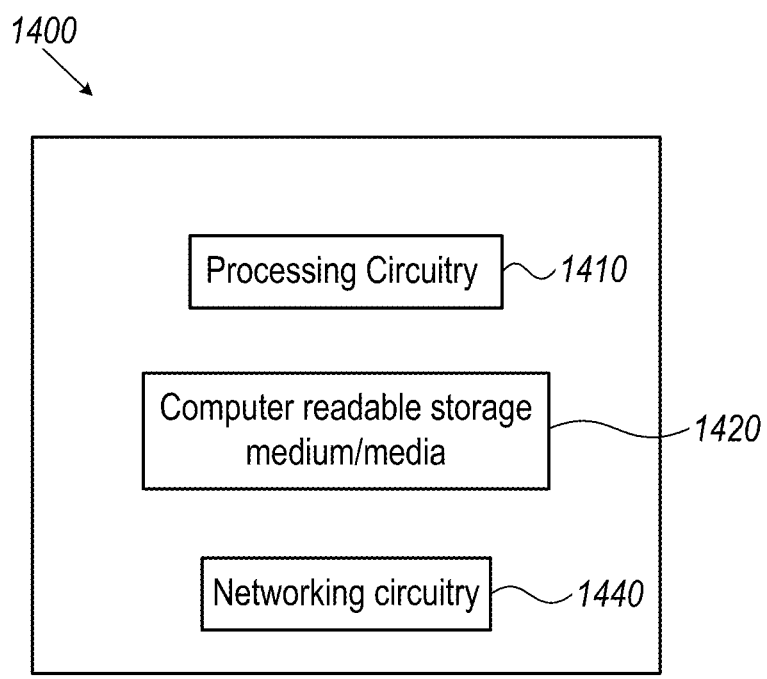
FIG. 14 is a block diagram of an apparatus, in accordance with some embodiments of the presently disclosed subject matter.

Reference is now made to FIG. 14 which is a block diagram of an apparatus 1400, in accordance with some embodiments of the presently disclosed subject matter. Apparatus 1400 may represent an example of a receiving apparatus, as discussed above; and/or may represent an example of a sending apparatus, as discussed above.

In FIG. 14, apparatus 1400 includes the following modules: processing circuitry 1410, one or more computer readable storage media 1420, and networking circuitry 1440. Modules 1410, 1420 and 1440 may be concentrated in one location or may be distributed over more than one location, depending on the deployment of apparatus 1400.

Processing circuitry 1410 may be adapted to perform functionality attributed herein to the apparatus 1400, including functionality relating to communicating (e.g. sending and/or receiving) via networking circuitry 1440, and/or including other functionality. For example, if apparatus 1400 is a sending apparatus, processing circuitry 1410 may be adapted to obtain indication(s) in stage 220, and/or to send indication(s) in stage 240. If apparatus 1400 is a receiving apparatus, processing circuitry 1410 may be adapted to send a request in stage 230, to receive indication(s) in stage 250, and/or to use indication(s) to direct packet(s) in stage 260. Sending and/or receiving, that is performed in any of such stages, may be performed by processing circuitry 1410 via networking circuitry 1440.

Processing circuitry 1410 may include, for instance any of the following: processor(s), state machine(s), other type(s) of integrated circuit(s) comparator(s), adder(s), multiplier(s), shift register(s), combinatory logic (such as multiplexer(s), OR gate(s), AND gate(s), XOR gate(s) etc.), electronic component(s) (e.g. resistor(s), inductor(s), capacitor(s), diode(s), transistor(s), other switching component(s), etc.), wiring, etc. Processing circuitry 1410 may additionally or alternatively include one or more integrated circuits (e.g. field programmable gate array(s) (FPGA(s)), application specific integrated circuit(s) (ASIC(s)), full-custom integrated circuit(s), etc.), printed circuit boards (also referred to as printed circuit board assemblies), and/or the like, which may for instance comprise circuitry (such as examples of processing circuitry 1410 described in the previous sentence) that is suitable for inclusion in such integrated circuit(s), printed circuit board(s) and/or the like. If processor(s) are included in processing circuitry 1410, each included processor may be of any suitable type operative to execute instructions, such as a load store processor, a processing pipe, a programmable very long instruction word (VLIW) engine, etc. Processor(s) may include, for example, any of the following: graphics processing unit(s) (GPU(s)), digital signal processor(s) (DSP(s)) central processing units (CPU(s)), etc. Any apparatus 1400 which includes processing circuitry 1410 may be considered to be a computer.

Each computer readable storage medium (also referred to herein as memory) 1420 may be of any appropriate type such as an optical computer readable storage medium, a magnetic computer readable storage medium, or an electronic computer readable storage medium. If there is a plurality of computer readable storage media 1420 in apparatus 1400, any two computer readable storage media 1420 in the plurality may be of the same type or different types. The at least one computer readable storage medium 1420 may include, for instance, any of the following: volatile, non-volatile, erasable, non-erasable, removable, non-removable, writeable, re-writeable memory, for short term storing, for long term storing, etc., such as registers, read-only memory (ROM), static random access memory (SRAM), dynamic random access memory (DRAM), flash memory, embedded DRAM, etc. The one or more computer readable storage media may store data used by processing circuitry 1410. For example, if processing circuitry 1410 includes processor(s), the data stored on the one or more computer readable storage media 1420 may include computer readable program code (also referred to herein as software or instructions), the processor(s) being adapted to execute such computer readable program code in order to perform at least part of the functionality attributed herein to processing circuitry 1410. Additionally or alternatively, the data used by processing circuitry 1410 that is stored on the one or more computer readable storage media 1420 may include other data such as indication(s) of the service chain(s) 180 associated with (e.g. closest to) user plane anchor(s) 160, etc.

Networking circuitry 1440 may include one or more components for wired communication (e.g. wired network interface(s), wired network switch(es), etc.); and/or may include one or more components for wireless communication (e.g. antenna(s), transmitter(s)/receiver(s), etc.) Networking circuitry 1440 may be used, for instance, for communicating with one or more other apparatuses in network 100. Continuing with describing such an instance, if apparatus 1400 represents a sending apparatus, networking circuitry 1440 may be used for communicating with a receiving apparatus and/or with additional apparatuses in network 100, whereas if apparatus 1400 represents a receiving apparatus, networking circuitry 1440 may be used for communicating with a sending apparatus and/or with additional apparatuses in network 100.

Optionally, apparatus 1400 includes one or more other modules known in the art such as input/output module(s) for interacting with user(s), if any, of apparatus 1400, etc.

Some embodiments of the subject matter may have one or more of the following advantages. First, an IP address of any CPE 130, UE 150, or host 140 may be associated with a service chain location, because an IP address for a CPE 130, UE 150, or host 140 may be obtained from the user plane anchor 160 anchoring the CPE 130 or UE 150; and the service chain 180 which is used by the CPE 130, UE 150, or host 140 may be dependent on the location of the user plane anchor 160. The service chain 180 that is used may be the service chain 180 that is closest to the user plane anchor 160. Second, an indication of a service chain 180 that is associated with a user plane anchor 160 may be sent to and received by an apparatus that is adapted to use the indication to direct packet(s), using procedure(s) such as SLAAC, DHCPv6, IKEv2, NAS, etc. Third, a CPE 130 may send an indication of an associated service chain 180 to a host 140 that is behind the CPE 130, by way of IP configuration parameters delivery mechanisms (e.g. SLAAC, DHCPv6, etc.) that may be used in the access network that connects the CPE 140 to the host 140. Fourth, records of service function instances may be published by a directory such as DNS which include indications of locations of service chains 180. Fifth, applications may perform service function instance lookups using service chain indications and optionally other service function element(s) (e.g. service function name, etc.). Sixth, an updated indication of a service chain 180 may be sent to and received by an apparatus that is adapted to use the updated indication to direct packet(s), when there is a re-anchoring. Seventh, an indication of an associated service chain may include an NSH header. Such an NSH header may be added to packet(s) by a CPE 130 or UE 150. Eighth, a UE 150, CPE 130, or host 140 may direct packets to service function instances that are associated with the user plane anchor 160 (e.g. to service function instances that are closest to the location of the user plane anchor 160 anchoring the UE 150 or the CPE 130). Ninth, sub-optimal routing between a user plane anchor 160 in one location and service function instances in another location may be reduced or eliminated, e.g. if service function instances closest to a user plane anchor 160 are used. Tenth, a UE 150, CPE 130 or host 140 may stay local to a user plane anchor 160 for certain applications (e.g. using service functions instances in the same zone 105 as the user plane anchor 160), reducing or eliminating the load on inter-zone traffic. Eleventh, application latency may be reduced (e.g. if service function instances closest to a user plane anchor 160 are used), resulting in a better user experience. Other advantages may be apparent from the description herein.

It will be appreciated that the subject matter contemplates, for example, a computer program product comprising a computer readable storage medium having computer readable program code embodied therein for executing one or more methods disclosed herein; and/or for executing one or more parts of method(s) disclosed herein, e.g. with reference to any of FIGS. 2 to 13. Further contemplated, for example, is computer readable program code for executing method(s) disclosed herein; and/or for executing part(s) of method(s) disclosed herein. Further contemplated, for example, is a computer readable storage medium having computer readable program code embodied therein for executing method(s) disclosed herein; and/or for executing part(s) of method(s) disclosed herein.

In the above description of example embodiments, numerous specific details are set forth in order to provide a thorough understanding of the subject matter. However, it will be appreciated by those skilled in the art that some examples of the subject matter may be practiced without these specific details. In other instances, well-known features have not been described in detail so as not to obscure the subject matter.

It will also be appreciated that various features of the subject matter which are, for clarity, described in the contexts of separate embodiments may also be provided in combination in a single embodiment. Conversely, various features of the subject matter which are, for brevity, described in the context of a single embodiment may also be provided separately or in any suitable subcombination.

It will further be appreciated by persons skilled in the art that the presently disclosed subject matter is not limited by what has been particularly shown and described hereinabove. Rather the scope of the subject matter is defined by the appended claims and equivalents thereof:

What is claimed is:

1. An apparatus comprising:
networking circuitry; and
processing circuitry, the processing circuitry configured to:
receive, via the networking circuitry, at least one indication of at least one service chain that is associated with a user plane anchor selected for anchoring a user equipment, out of a plurality of service chains in a network, the apparatus being the user equipment or being a host behind a customer premises equipment, and the at least one service chain being fewer in number than the plurality of service chains, wherein the at least one indication is received in a message that includes a service location label indicative of a first location of the at least one service chain and not indicative of a second location of the user plane anchor, and
use the at least one indication to direct at least one packet to at least one service function in the at least one service chain.

2. The apparatus of claim 1, wherein one or more indications are indicative of one or more locations of one or more service chains, wherein said at least one service chain includes said one or more service chains and said at least one indication includes said one or more indications, and wherein said processing circuitry being configured to use the at least one indication, includes the processing circuitry being configured to:
use the one or more indications to construct one or more queries for one or more Internet Protocol (IP) addresses relating to one or more service functions in the one or more service chains, wherein said at least one service function includes said one or more service functions;
receive, via the networking circuitry, the one or more IP addresses in response to the one or more queries; and
send, via the networking circuitry, one or more packets relating to the one or more service functions to the one or more IP addresses, wherein said at least one packet includes said one or more packets.

3. The apparatus of claim 1, wherein said at least one indication includes one or more network service headers for one or more traffic classes, each of said one or more network service headers being indicative of one or more service functions, wherein said at least one service function includes said one or more service functions, and wherein said processing circuitry being configured to use the at least one indication includes said processing circuitry being configured to:
attach the one of more network service headers to one or more packets associated with the one or more traffic classes, wherein said at least one packet includes said one or more packets; and
send, via the networking circuitry, said one or more packets.

4. The apparatus of claim 1, wherein said processing circuitry is further configured to request, via the networking circuitry, the at least one indication.

5. The apparatus of claim 1, wherein said processing circuitry being configured to receive, via the networking circuitry, the at least one indication, includes being configured to receive, via the networking circuitry, one or more of the at least one indication during establishment of a session.

6. The apparatus of claim 1, wherein said processing circuitry being configured to receive, via the networking circuitry, the at least one indication, includes being configured to receive, via the networking circuitry, one or more of the at least one indication as metadata associated with one or more Internet Protocol address options.

7. An apparatus comprising:
networking circuitry; and
processing circuitry, wherein the processing circuitry is configured to:
receive, via the networking circuitry, a request from a user equipment or from a host that is behind a customer premises equipment, and
send, via the networking circuitry, a response to the user equipment or to the host, the response including at least one indication of at least one service chain that is associated with a user plane anchor selected for anchoring the user equipment, out of a plurality of service chains in a network, the at least one service chain being fewer in number than the plurality of service chains, and the response enabling at least one of: the user equipment, the host, or at least one other host behind the customer premises equipment, to use the at least one indication to direct at least one packet to at least one service function in the at least one service chain, the response includes a service location label indicative of a first location of the at least one service chain and not indicative of a second location of the user plane anchor.

8. The apparatus of claim 7, wherein the request requests the at least one indication.

9. The apparatus of claim 7, wherein said processing circuitry is further configured to obtain the at least one indication, including being configured to identify the at least one service chain.

10. The apparatus of claim 7, wherein said processing circuitry is further configured to obtain the at least one indication, including configured to receive, via the networking circuitry, the at least one indication.

11. The apparatus of claim 7, wherein the apparatus implements the user plane anchor.

12. The apparatus of claim 7, wherein the apparatus implements a mobility controller.

13. The apparatus of claim 7, wherein the apparatus implements an evolved packet data gateway or a Non-3GPP Core Network Interworking Function.

14. The apparatus of claim 7, wherein said response is an Attach Accept, a Router Advertisement, a Dynamic Host Configuration Protocol version 6 reply, or an Internet Key Exchange version 2 configuration reply.

15. A method comprising:
receiving a request from a user equipment or from a host that is behind a customer premises equipment; and
sending a response to the user equipment, or to the host, which includes at least one indication of at least one service chain that is associated with a user plane anchor selected for anchoring the user equipment, out of a plurality of service chains in a network, wherein the at least one service chain is fewer in number than the plurality of service chains, and wherein the response enables at least one of: the user equipment, the host, or at least one other host behind the customer premises equipment, to use the at least one indication to direct at least one packet to at least one service function in the at least one service chain, wherein the response includes a service location label indicative of a first location of the at least one service chain and not indicative of a second location of the user plane anchor.

16. The method of claim 15, further comprising:
using the at least one indication to direct the at least one packet to the at least one service function.

17. The method of claim 15, further comprising:
for each of one or more of the at least one service function, configuring a directory record for a service function to include an indication of a service chain comprising the service function, enabling a directory to locate the directory record in response to a query that include the indication, wherein the at least one indication includes the indication and the at least one service chain includes the service chain.

18. The method of claim 15, further comprising:
receiving the response; and
after another user plane anchor is selected for anchoring the user equipment, receiving another response which includes one or more indications of one or more service chains associated with the other user plane anchor, out of the plurality of service chains.

19. The method of claim 15, wherein the at least one service chain is closest in proximity to the user plane anchor, out of the plurality of service chains in the network, the proximity is determined based on a network topology.

20. The method of claim 15, wherein said response is an Attach Accept, a Router Advertisement, a Dynamic Host Configuration Protocol version 6 reply, or an Internet Key Exchange version 2 configuration reply.

\* \* \* \* \*